(12) United States Patent
Sumi et al.

(10) Patent No.: US 8,441,224 B2
(45) Date of Patent: May 14, 2013

(54) DRIVING APPARATUS FOR A VEHICLE-MOUNTED ELECTRIC MOTOR

(75) Inventors: Tomoyuki Sumi, Nagoya (JP); Hiroshi Amano, Nishio (JP); Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 373 days.

(21) Appl. No.: 12/805,766

(22) Filed: Aug. 19, 2010

(65) Prior Publication Data

US 2011/0050136 A1 Mar. 3, 2011

(30) Foreign Application Priority Data

Aug. 31, 2009 (JP) .................................. 2009-199596

(51) Int. Cl.
*H02P 27/04* (2006.01)

(52) U.S. Cl.
USPC ........... 318/801; 318/721; 318/722; 318/800; 180/65.265; 180/65.275; 180/65.285

(58) Field of Classification Search ............ 318/400.01, 318/400.26, 400.27, 400.28, 701, 705, 721, 318/722, 786, 789, 599, 794, 795, 796, 437, 318/801, 800; 180/65.265, 65.275, 65.285
See application file for complete search history.

(56) References Cited

U.S. PATENT DOCUMENTS

| | | | | |
|---|---|---|---|---|
| 5,942,818 A * | 8/1999 | Satoh et al. | ..................... | 310/46 |
| 7,847,495 B2 * | 12/2010 | Oyobe et al. | ..................... | 318/53 |
| 7,909,124 B2 * | 3/2011 | Holmes | ..................... | 180/65.265 |
| 8,091,665 B2 * | 1/2012 | Kuno | ..................... | 180/65.285 |
| 8,186,465 B2 * | 5/2012 | Oyobe et al. | ............. | 180/65.275 |
| 2007/0120520 A1 * | 5/2007 | Miyazaki et al. | ............. | 318/801 |

FOREIGN PATENT DOCUMENTS

| JP | 2002-027761 | * | 1/2002 |
|---|---|---|---|
| JP | A-2002-027761 | | 1/2002 |
| JP | A-2005-073399 | | 3/2005 |

* cited by examiner

*Primary Examiner* — Antony M Paul
(74) *Attorney, Agent, or Firm* — Posz Law Group, PLC

(57) ABSTRACT

An inverter circuit for a motor outputs three-phase AC currents, which are outputted from common connection points to stator coils, based on output voltage of a DC power source and a power supply capacitor by a switching operation of transistors. An inverter control circuit determines that a system main relay is turned off, upon receiving a main relay-off signal from an electronic control unit. The inverter control circuit turns on the low-side transistors, while turning off the high-side transistors. A discharge current flows from the positive electrode to the negative electrode of the power supply capacitor through the stator coil and the low-side transistors, so that electric charge stored in the power supply capacitor is discharged.

8 Claims, 24 Drawing Sheets

US 8,441,224 B2

DRIVING APPARATUS FOR A VEHICLE-MOUNTED ELECTRIC MOTOR

CROSS REFERENCE TO RELATED APPLICATION

This application is based on and incorporates herein by reference Japanese patent application No. 2009-199596 filed on Aug. 31, 2009.

FIELD OF THE INVENTION

The present invention relates to a driving apparatus for a vehicle-mounted electric motor, which drives an electric motor mounted on a vehicle by electric power of a direct current power source.

BACKGROUND OF THE INVENTION

A conventional driving apparatus includes, as disclosed in patent document 1 (JP 2005-73399A), an inverter circuit and a control circuit. The inverter circuit outputs three-phase AC currents to a three-phase AC synchronous motor. The control circuit controls the inverter circuit.

Specifically, the inverter circuit is configured by three sets of a pair of series-connected transistors. The three sets are connected in parallel between a positive bus and a negative bus. A direct current (DC) power source is connected between the positive bus and the negative bus. A capacitor (smoothing capacitor), which smoothes a voltage supplied from the DC power source to the inverter circuit, is provided between the positive bus and the negative bus in parallel to the DC power source.

A main relay switch is provided between the DC power source and the smoothing capacitor. The main relay switch connects and disconnects the DC power source and the smoothing capacitor. Thus, the main relay switch connects and disconnects the DC power source and the inverter circuit.

A discharge switch is connected between the positive bus and the negative bus. The discharge switch is provided on the smoothing capacitor side relative to the main relay switch. The discharge switch connects and disconnects the positive electrode and the negative electrode of the smoothing capacitor.

When the main relay switch is turned on with the discharge switch being in the turned-off state, the output voltage of the DC power source is smoothed by the smoothing capacitor and supplied to the inverter circuit. The control circuit controls the six transistors of the inverter circuit to turn on and off, so that the inverter circuit outputs the three-phase AC currents to the stator coil of the three-phase synchronous motor based on the output voltage of the DC power source.

In an emergency situation, such as an abnormality or accident, the main relay switch is turned off to stop supply of the output voltage from the DC power source to the inverter circuit. In addition, the discharge switch is turned on to allow a current to flow from the positive electrode to the negative electrode of the smoothing capacitor through the discharge switch.

The electric charge stored in the smoothing capacitor is thus discharged. As a result, passengers in a vehicle are protected from being damaged by the electric charge stored in the smoothing capacitor even when the driving apparatus is broken by an accident or the like.

In some driving apparatuses for a three-phase AC synchronous motor having a stator coil, which is star-connected to a neutral point, a DC power source is not connected between a positive bus and a negative bus of the DC power source but is connected between the positive bus and the neutral point of the stator coil.

If the DC power source, the smoothing capacitor and the discharge switch are connected between the positive bus and the neutral point of the stator coil and a power supply capacitor is additionally connected between the positive bus and the negative bus, the power supply capacitor is not enabled to discharge because of the transistors forming the inverter circuit even when the discharge switch is turned on.

If the DC power source, the smoothing capacitor and the discharge switch are connected between the positive bus and the neutral point of the stator coil and a power supply capacitor is additionally connected between the neutral point of the stator coil and the negative bus, the power supply capacitor is not enabled to discharge similarly.

In another driving apparatus, the DC power source as well as the smoothing capacitor and the discharge switch are connected between the neutral point of the stator coil and the negative bus and a power supply capacitor is additionally connected between the positive bus and the negative bus. The power supply capacitor is not enabled to discharge similarly.

If the DC power source, the smoothing capacitor and the discharge switch are connected between the neutral point of the stator coil and the negative bus and a power supply capacitor is additionally connected between the positive bus and the neutral point of the stator coil, the power supply capacitor is not enabled to discharge similarly.

SUMMARY OF THE INVENTION

It is a first object of the present invention to enable capacitor discharge in a driving apparatus for a vehicle-mounted electric motor, in which a DC power source is connected between a neutral point of a stator coil and a positive bus and a capacitor is connected between the positive bus and a negative bus.

It is a second object of the present invention to enable capacitor discharge in a driving apparatus for a vehicle-mounted electric motor, in which a DC power source is connected between a neutral point of a stator coil and a positive bus and a capacitor is connected between the neutral point of the stator coil and a negative bus.

It is a third object of the present invention to enable capacitor discharge in a driving apparatus for a vehicle-mounted electric motor, in which a DC power source is connected between a neutral point of a stator coil and a negative bus and a capacitor is connected between a positive bus and the negative bus.

It is a fourth object of the present invention to enable capacitor discharge in a driving apparatus for a vehicle-mounted electric motor, in which a DC power source is connected between a neutral point of a stator coil and a negative bus and a capacitor is connected between a positive bus and the neutral point of the stator coil.

For attaining the first object, a driving apparatus for an electric motor comprises an inverter circuit, a power supply capacitor, a DC power source and a power source switch. The inverter circuit has a plurality of pairs of switching elements connected in parallel between a positive bus and a negative bus. Each pair of the switching elements includes a high-side switching element and a low-side switching element connected in series in correspondence to each phase of the motor. The power supply capacitor is connected between the positive bus and the negative bus. The DC power source is connected between the positive bus and the neutral point of the stator coil. The power source switch is connected between the DC power source and at least one of the positive bus and the neutral point. The inverter circuit is configured to output AC currents to the stator coil based on output voltages of the DC power source and the power supply capacitor by a switching operation of the switching elements. The inverter circuit checks whether the power source switch is in a turned-off state, in which at least one of the positive bus and the neutral point is disconnected from the DC power source. The inverter circuit further controls the switching elements to allow a current to flow from a positive electrode of the power supply capacitor to a negative electrode of the power supply capacitor through the stator coil, when the power source switch is in the turned-off state.

For attaining the second object, a driving apparatus for an electric motor comprises an inverter circuit, a power supply capacitor, a DC power source and a power source switch. The inverter circuit has a plurality of pairs of switching elements connected in parallel between a positive bus and a negative bus. Each pair of the switching elements includes a high-side switching element and a low-side switching element connected in series in correspondence to each phase of the motor. The power supply capacitor is connected between the neutral point and the negative bus. The DC power source is connected between the positive bus and the neutral point of the stator coil. The power source switch is connected between the DC power source and at least one of the positive bus and the neutral point. The inverter circuit is configured to output AC currents to the stator coil based on output voltages of the DC power source and the power supply capacitor by a switching operation of the switching elements. The inverter circuit checks whether the power source switch is in a turned-off state, in which at least one of the positive bus and the neutral point is disconnected from the DC power source. The inverter circuit further controls the switching elements to allow a current to flow from a positive electrode of the power supply capacitor to a negative electrode of the power supply capacitor through the stator coil, when the power source switch is in the turned-off state.

For attaining the third object, a driving apparatus for an electric motor comprises an inverter circuit, a power supply capacitor, a DC power source and a power source switch. The inverter circuit has a plurality of pairs of switching elements connected in parallel between a positive bus and a negative bus. Each pair of the switching elements includes a high-side switching element and a low-side switching element connected in series in correspondence to each phase of the motor. The power supply capacitor is connected between the positive bus and the negative bus. The DC power source is connected between the neutral point and the negative bus. The power source switch is connected between at least one of the neutral point and the negative bus and the DC power source. The inverter circuit is configured to output AC currents to the stator coil based on output voltages of the DC power source and the power supply capacitor by a switching operation of the switching elements. The inverter circuit checks whether the power source switch is in a turned-off state, in which at least one of the neutral point and the negative bus is disconnected from the DC power source. The inverter circuit further controls the switching elements to allow a current to flow from a positive electrode of the power supply capacitor to a negative electrode of the power supply capacitor through the stator coil, when the power source switch is in the turned-off state.

For attaining the fourth object, a driving apparatus for an electric motor comprises an inverter circuit, a power supply capacitor, a DC power source and a power source switch. The inverter circuit has a plurality of pairs of switching elements connected in parallel between a positive bus and a negative bus. Each pair of the switching elements includes a high-side switching element and a low-side switching element connected in series in correspondence to each phase of the motor. The power supply capacitor is connected between the positive bus and the neutral point. The DC power source is connected between the neutral point and the negative bus. The power source switch is connected between at least one of the neutral point and the negative bus and the DC power source. The inverter circuit is configured to output AC currents to the stator coil based on output voltages of the DC power source and the power supply capacitor by a switching operation of the switching elements. The inverter circuit checks whether the power source switch is in a turned-off state, in which at least one of the neutral point and the negative bus is disconnected from the DC power source. The inverter circuit further controls the switching elements to allow a current to flow from a positive electrode of the power supply capacitor to a negative electrode of the power supply capacitor through the stator coil, when the power source switch is in the turned-off state.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

The present invention will be described in more detail with reference to various embodiments, in which a driving apparatus for a vehicle-mounted motor is implemented as an electrically compressor, which is driven electrically.

First Embodiment

Figure 1:
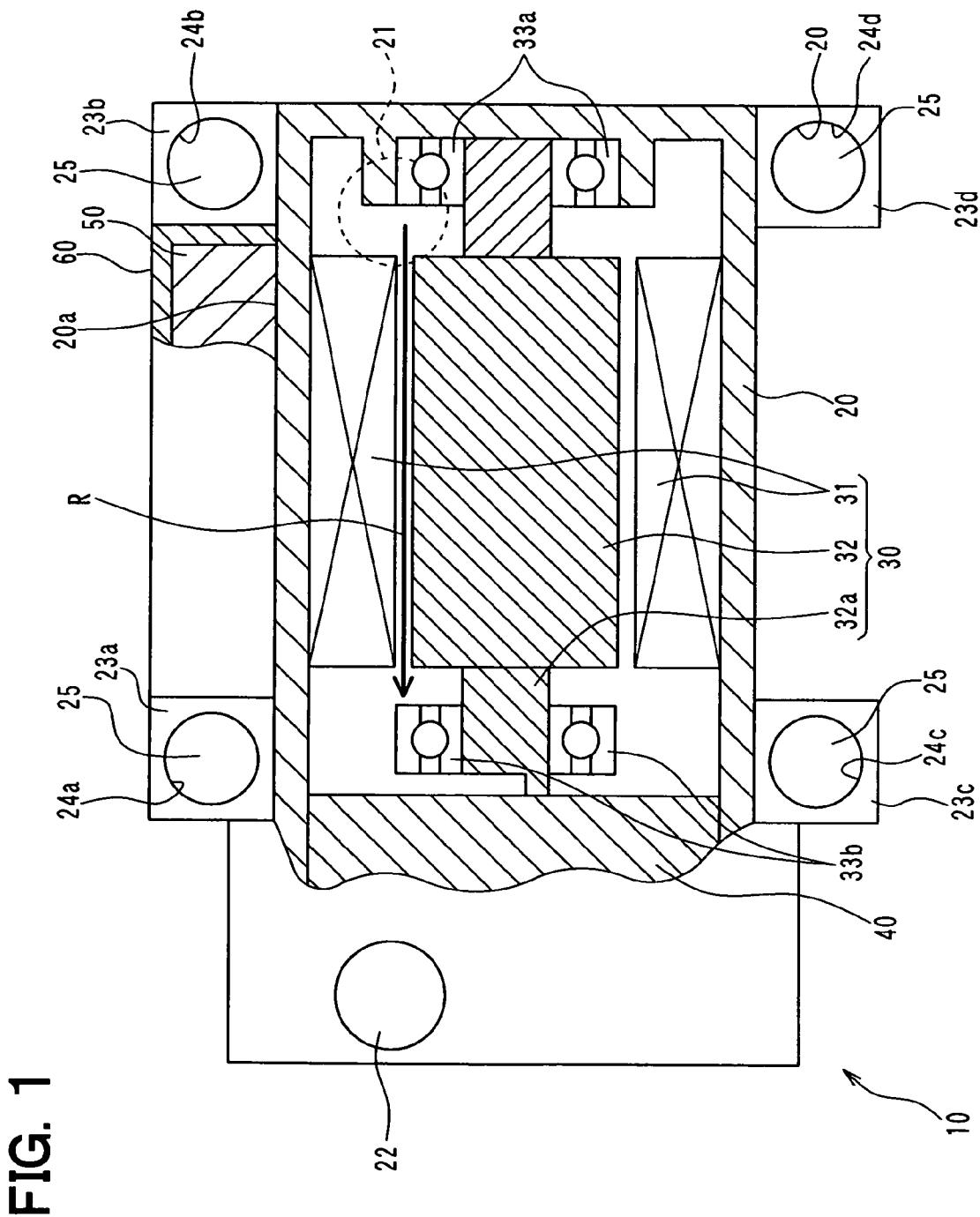
FIG. 1 is a partial sectional view of a driving apparatus for a vehicle-mounted electric motor of the present invention.

Referring to FIG. 1, as a driving apparatus for a vehicle-mounted electric motor, an electric compressor device is mounted in an engine compartment of a hybrid vehicle and forms a refrigeration cycle of a vehicular air-conditioning system in combination with a condenser, a pressure reducer and an evaporator. The hybrid vehicle is driven by an internal combustion engine and/or an electric motor.

The compressor device 10 includes a compressor housing 20, an electric motor 30, a compressor 40, a driving apparatus 50 and a cover 60.

The housing 20 is made of a metal such as iron or aluminum and formed generally in a cylindrical shape. The housing 20 has a refrigerant inlet port 21, a refrigerant outlet port 22 and attachment feet 23a, 23b, 23c and 23d. The refrigerant inlet port 21 is a passage for suctioning the refrigerant from the evaporator side. The refrigerant outlet port 22 is a passage for discharging the refrigerant toward the condenser.

The attachment feet 23a and 23b are provided at the upper side of the compressor housing 20. The attachment feet 23c and 23d are provided at the lower side of the compressor housing 20.

Each attachment foot 23a, 23b 23c or 23d is formed generally in a square shape and extends perpendicularly to FIG. 1 sheet. Bolt holes 24a, 24b, 24c and 24d are formed in the attachment feet 23a, 23b, 23c and 23d, respectively. Bolts 25 are inserted into the bolt holes 24a, 24b, 24c and 24d to fixedly attach the compressor housing 20 to an internal combustion engine (not shown), for example to a front wall of the same, provided in an engine compartment.

On the upper side of the compressor housing 20, a mounting surface 20a is formed, to which the driving apparatus 50 is fixed. The mounting surface 20a is formed between the attachment feet 23a and 23b.

The electric motor 30 is a three-phase synchronous motor and provided in the compressor housing 20. The electric motor 30 has a stator 31 and a rotor 32.

The stator 31 is formed by a stator core and a stator coil. The stator core is fixed to an inner peripheral wall of the compressor housing 20. The stator coil is wound on the stator core.

The rotor 32 is fitted with permanent magnets and formed generally in the cylindrical shape. A rotation shaft 32a is fitted in the central axis part of the rotor 32. The rotation shaft 32a is arranged to extend in the direction of the central axis of the compressor housing 20. The rotation shaft 32a is supported rotatably by a pair of bearings 33a and 33b. The bearings 33a and 33b are fitted to the compressor housing 20. The rotor 32 rotates due to a rotating magnetic field generated by the stator coil.

The compressor 40 is provided at one axial end side of the rotation shaft 32a of the electric motor 30. The compressor 40 is driven by the rotation shaft 32a of the electric motor 30 to suction, compress and discharge the refrigerant. The compressor 40 may be a scroll compressor, in which the refrigerant is suctioned, compressed and discharged while swirling relative to a fixed scroll.

The driving apparatus 50 is mounted on the mounting surface 20a and has an electronic circuit, which receives electric power from an electric power source and outputs three-phase AC currents to the stator coil.

The cover 60 covers the driving apparatus 50 from the upper side, that is, outer side. The cover 60 is fixed to the compressor housing 20 by fastening members such as bolts. The driving apparatus 50 is thus sandwiched between the cover 60 and the mounting surface 20a.

Figure 2:
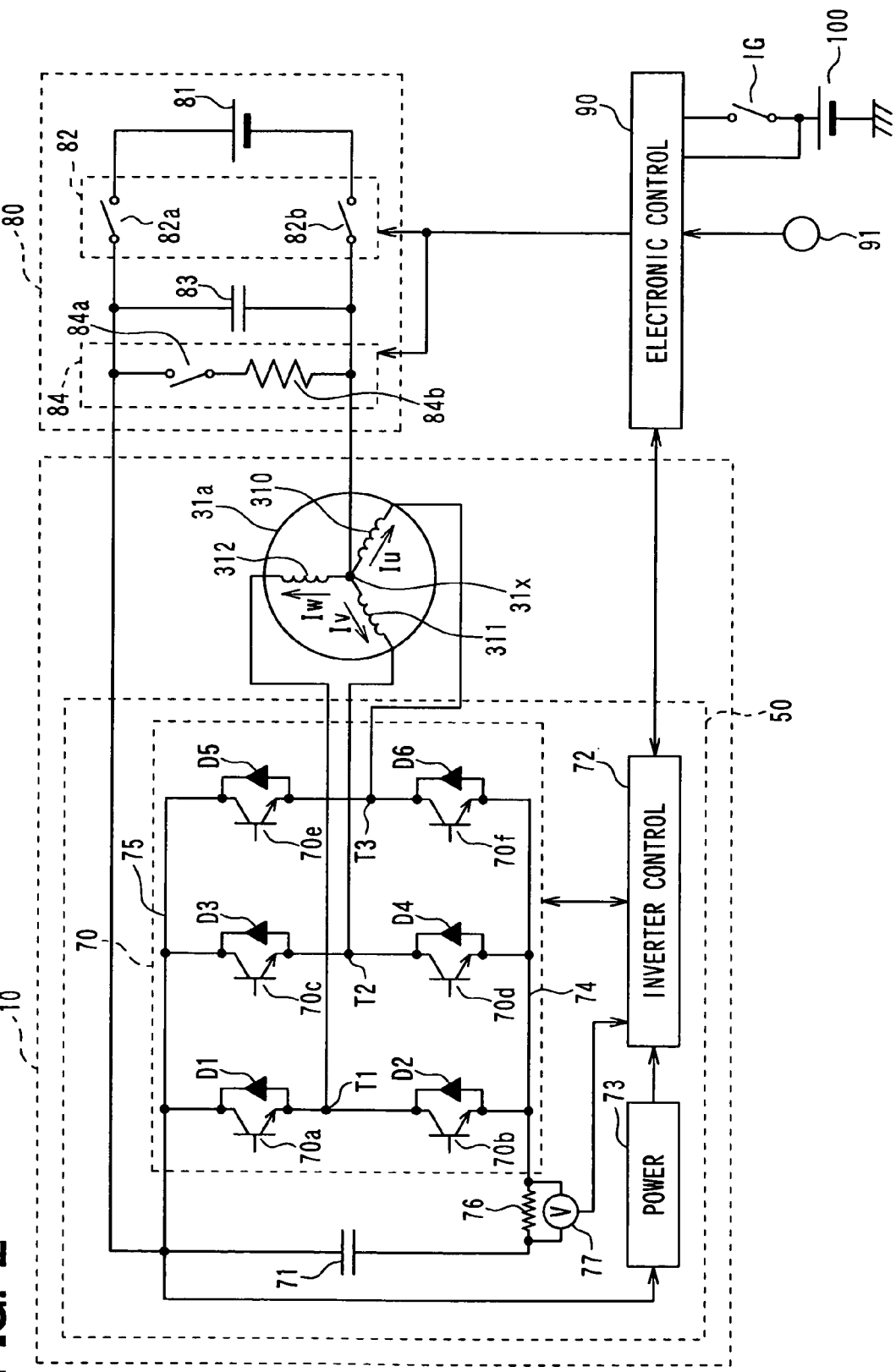
FIG. 2 is an electric circuit diagram of the driving apparatus according to a first embodiment of the present invention.

The electric compressor device 10 and other electric parts such as an electric power source unit 80 are shown in FIG. 2.

The stator coil 31a of the electric motor 30 of the electric compressor device 10 is formed by a U-phase coil 310, a V-phase coil 311 and a W-phase coil 312, which are star-connected to a neutral point 31x.

The power source unit 80 is provided to supply the electric compressor device 10 with DC (direct current) electric power. Specifically, the power source unit 80 includes a DC power source 81, a system main relay 82, a smoothing capacitor 83 and a discharge circuit 84.

A positive electrode of the DC power source 81 is connected to a positive bus 75 of an inverter circuit 70. A negative electrode of the DC power source 81 is connected to the neutral point 31x of the stator coil 31a. A positive electrode of the smoothing capacitor 83 is connected to the positive bus 75 of the inverter circuit 70. A negative electrode of the smoothing capacitor 83 is connected to the neutral point 31x of the stator coil 31a. The capacitor 83 is provided to smooth an output voltage supplied from the DC power source 81 to the inverter circuit 70. The positive bus 75 has an electric potential higher than that of the negative bus 74.

The system main relay 82 is provided as a power source switch, which has movable switches 82a and 82b. The switch 82a is provided between the positive electrode of the DC power source 81 and the positive electrode of the smoothing capacitor 83. The switch 82a connects and disconnects the positive electrode of the DC power source 81 and the positive electrode of the smoothing capacitor 83, thereby closing and opening a current path between the positive electrodes of the DC power source 81 and the smoothing capacitor 83. The switch 82a thus connects and disconnects the positive electrode of the DC power source 81 and the positive bus 75 of the inverter circuit 70.

The switch 82b is provided between the negative electrode of the DC power source 81 and the negative electrode of the smoothing capacitor 83. The switch 82b connects and disconnects the negative electrode of the DC power source 81 and the negative electrode of the smoothing capacitor 83, thereby closing and opening a current path between the negative electrodes of the DC power source 81 and the smoothing capacitor 83. The switch 82b thus connects and disconnects the negative electrode of the DC power source 81 and the neutral point 31x of the stator coil 31a. The switches 82a and 82b are electromagnetic relays, which are controlled to turn on and off by an electronic control unit 90.

The discharge circuit 84 is formed of a relay switch 84a and a resistor 84b. The relay switch 84a and the resistor 84b are connected in series between the positive electrode and the negative electrode of the smoothing capacitor 83, that is, in parallel to the smoothing capacitor 83. The relay switch 84a is provided as a discharge switch, which connects and disconnects the positive electrode and the negative electrode of the smoothing capacitor 83. The resistor 84b limits a current, which flows between the positive electrode and the negative electrode of the smoothing capacitor 83 through the relay switch 84a.

The driving apparatus 50 includes an inverter circuit 70, a power supply capacitor 71, an inverter control circuit 72, an electric power source 73, a resistor 76 and a voltage sensor 77.

The inverter circuit 70 is configured to output three-phase AC currents to the stator coil 31a based on the output voltage of the DC power source 81 and the output voltage of the power supply capacitor 71. The inverter circuit 70 is formed of transistors 70a, 70b, 70c, 70d, 70e and 70f as well as respective diodes D1, D2, D3, D4, D5 and D6.

The transistors 70a and 70b are connected in series between a negative bus 74 and a positive bus 75. The transistors 70c and 70d are connected in series between the negative bus 74 and the positive bus 75. The transistors 70e and 70f are connected in series between the negative bus 74 and the positive bus 75.

The transistors 70a and 70b are configured to form a first pair of series-connected high-side and low-side switching elements, respectively, in correspondence to the W-phase. A common junction T1 between the transistors 70a and 70b is connected to the W-phase coil 312. The transistors 70c and 70d are configured to form a second pair of series-connected high-side and low-side switching elements, respectively, in correspondence to the V-phase. A common junction T2 between the transistors 70c and 70d is connected to the V-phase coil 311. The transistors 70e and 70f are configured to form a third pair of series-connected high-side and low-side switching elements, respectively, in correspondence to the U-phase. A common junction T3 between the transistors 70e and 70f is connected to the U-phase coil 310.

Although the transistors 70a to 70f are shown as NPN transistors, the transistors 70a to 70f may be other transistors such as insulated-gate bipolar transistors (IGBTs) or field effect transistors (FETs).

The diodes D1 to D6 are connected in parallel to the corresponding transistors 70a to 70f, respectively, in such a manner that each diode is reverse-biased relative to the corresponding transistor.

The capacitor 71 is provided as a power supply capacitor, which supplies its output voltage to the inverter circuit 70 in addition to the output voltage of the DC power source 81 of the power source unit 80. A positive electrode of the power supply capacitor 71 is connected to the positive bus 75 of the inverter circuit 70. A negative electrode of the power supply capacitor 71 is connected to the negative bus 74 of the inverter circuit 70.

The resistor 76 is connected between the negative electrode of the power supply capacitor 71 and the negative bus 74. The voltage sensor 77 is configured to detect a voltage developed between both ends of the resistor 76.

The inverter control circuit 72 is formed of a microcomputer, a memory and the like to execute control processing for motor rotation speed control and capacitor discharge control. The motor rotation speed control processing is provided for controlling a rotation speed of the electric motor 30 by way of the transistors 70a to 70f. The capacitor discharge control processing is provided for discharging electric charge from the power supply capacitor 71 in response to a command from an electronic control unit 90.

The power source 73 is configured to supply the inverter control circuit 72 with electric power based on a voltage between the positive bus 75 and the neutral point 31x of the stator coil 31a.

Specifically, the power source 73 includes a DC-DC converter, which converts the voltage between the positive bus 75 and the neutral point 31x of the stator coil 31a to a fixed voltage, and a capacitor, which smoothes a voltage outputted to the inverter control circuit 72. This capacitor stores electric power, which is supplied to the inverter control circuit 72.

The electronic control unit 90 is supplied with electric power from a DC power source 100. It is configured to execute output processing for outputting a command value of a rotation speed of the electric motor 30. The command value of the rotation speed indicates a command rotation speed Na of the electric motor 30. The output voltage of the DC power source 100 is lower than that of the DC power source 81.

The electronic control unit 90 is also configured to execute control processing for controlling the system main relay 82 and the relay switch 84a of the discharge circuit 84 in response to a detection signal of an accident detection sensor 91. The accident detection sensor 91 may be an acceleration sensor, which detects impacts of collision of the hybrid vehicle with the other vehicle as acceleration.

The first embodiment operates as follows.

When an ignition switch IG is turned on by a vehicle driver, the electronic control unit 90 turns on the switches 82a and 82b of the system main relay 82 while maintaining the relay switch 84a of the discharge circuit 84 in the turned-off state.

As a result, the positive electrode of the DC power source 81 and the positive electrode of the smoothing capacitor 83 are connected to each other, and the negative electrode of the DC power source 81 and the negative electrode of the smoothing capacitor 83 are also connected to each other. The output voltage of the DC power source 81 is thus smoothed and supplied between the positive bus 75 and the neutral point 31x of the stator coil 31a.

When the electronic control unit 90 outputs the command value of the rotation speed of the electric motor 30 to the inverter control circuit 72, the inverter control circuit 72 executes the motor rotation speed control processing in accordance with the command value of the rotation speed of the electric motor 30.

When the acceleration indicating collision impact in excess of a predetermined level is detected by the accident detection sensor 91 under the condition that the ignition switch IG is in the turned-on state, the electronic control unit 90 determines that the hybrid vehicle had a collision with the other vehicle.

The electronic control unit 90 responsively turns off the switches 82a and 82b of the system main relay 82 and turns on the relay switch 84a of the discharge circuit 84. As a result, the positive electrode of the DC power source 81 and the positive electrode of the smoothing capacitor 83 are disconnected from each other, and the negative electrode of the DC power source 81 and the negative electrode of the smoothing capacitor 83 are also disconnected from each other. The output voltage of the DC power source 81 is not supplied to the inverter control circuit 72 any more.

With the relay switch 84a of the discharge circuit 84 being turned on, a current flows from the positive electrode of the smoothing capacitor 83 to the negative electrode of the smoothing capacitor 83 through the relay switch 84a and the resistor 84b as a discharge current of the smoothing capacitor 83. The electric charge of the smoothing capacitor 83 is thus discharged.

The electronic control unit 90 also outputs a main relay-off signal, which indicates that the system main relay 82 has been turned off, to the inverter control circuit 72. The main relay-off signal is used in the capacitor discharge control processing executed by the inverter control circuit 72.

When the ignition switch IG is turned off by the vehicle driver, the electronic control unit 90 turns off the switches 82a and 82b of the system main relay 82 and turns on the relay switch 84a of the discharge circuit 84 in the same manner as in the case that an occurrence of the collision accident or the like has been detected. The electronic control unit 90 also outputs the main relay-off signal to the inverter control circuit 72.

The motor rotation speed control processing and the capacitor discharge control processing are executed in the following manner.

(Motor Rotation Speed Control)

Figure 3:
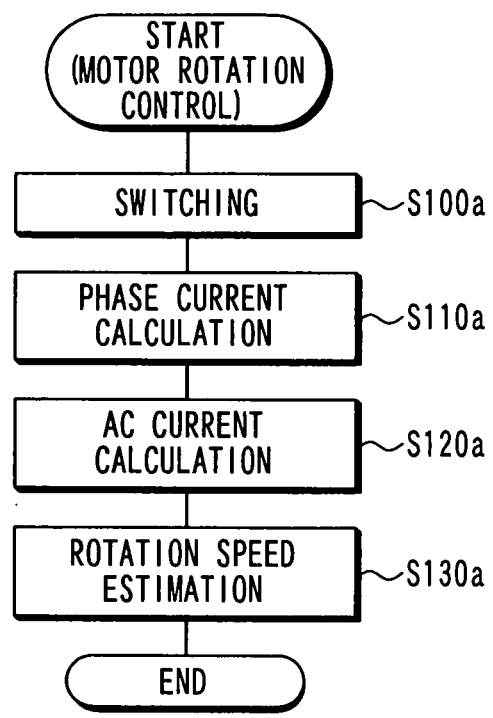
FIG. 3 is a flowchart of motor rotation speed control processing executed by an inverter control circuit shown in FIG. 2.

The inverter control circuit 72 executes the motor rotation speed control processing as shown by a flowchart in FIG. 3. This motor rotation speed control processing is executed repeatedly.

At step S100a, the transistors 70a to 70f are switching-controlled so that the rotation speed of the electric motor 30 approaches the command rotation speed Na outputted from the electronic control unit 90. In this control, the three-phase AC currents are outputted from the common junctions T1, T2 and T3 to the stator coil 31a based on the output voltage of the power supply capacitor 71 and the output voltage of the DC power source 81.

At next step S110a, one of the phase currents among a W-phase current Iw, a V-phase current Iv and a U-phase current Iu is calculated as the three-phase current in a manner, which will be described in detail below.

As shown in FIG. 2, the W-phase current Iw is the phase current, which flows between the common junction T1 and the W-phase coil 312. The V-phase current Iv is the phase current, which flows between the common junction T2 and the V-phase coil 311. The U-phase current Iu is the phase current, which flows between the common junction T3 and the U-phase coil 310.

At step S120a, the three-phase AC currents are calculated, based on the phase currents Iw, Iv and Iu calculated at step S110a, in a manner which will be described in detail below.

At step S130a, an estimated value of the rotation speed (estimated rotation speed) Ns of the electric motor 30 is calculated based on the angular velocity of the three-phase AC currents calculated at step 120a. In the next execution of step S100a, the transistors 70a to 70f are switching-controlled to reduce a difference between the estimated rotation speed Ns and the command rotation speed Na. Following step S100a, steps S110a, S120a and S130 are repeated for the phase current calculation, the three-phase AC current calculation and the rotation speed estimation, respectively.

The above sequence of steps S100a, S110a, S120a and S130a are repeated as long as the command value of the rotation speed is received from the electronic control unit 90.

The transistors 70a to 70f are thus controlled to switch over to turn on and off. As a result, the three-phase AC currents are outputted from the common junctions T1, T2 and T3 to the stator coil 31a based on the output voltage of the power supply capacitor 71 and the output voltage of the DC power source 81. Specifically, as the power supply capacitor 71 discharges its electric charge, the three-phase AC currents are outputted from the common junctions T1, T2 and T3 to the stator coil 31a.

The stator coil 31 responsively generates a rotating magnetic field. The rotor 32 rotates in synchronized relation to the rotating magnetic field. Thus, the rotation speed of the rotation shaft 32a of the electric motor 30 is controlled.

When the transistors 70a to 70f are switching-controlled, the power supply capacitor 71 is charged with electric charge.

Specifically, when the transistor 70a among the transistors 70a, 70c and 70e, which are on the positive bus 75 side is turned on, the current flows from the positive bus 75 to the W-phase coil 312 of the stator coil 31a through the transistor 70a based on the output voltages of the power supply capacitor 71 and the DC power source 81. The stator coil 31a responsively generates an induced voltage.

When the transistor 70a is thereafter turned off, a current corresponding to the induced voltage flows from the negative electrode of the power supply capacitor 71 to the W-phase coil 312 of the stator coil 31a through the diode D2. The electric charge is thus charged in the power supply capacitor 71. The capacitor 71 repeats discharging and charging the electric charge by the switching operation of the transistors 70a to 70f.

The motor 30 drives the compressor 40 by its rotation of the rotation shaft 32a (FIG. 1). As a result, the refrigerant flows from the evaporator side into the refrigerant inlet port 21, flows through a clearance between the rotor 32 and the stator 31 as shown by an arrow R in FIG. 1 and compressed by the compressor 40. The compressed refrigerant is discharged from the refrigerant outlet port 22.

The phase currents and the three-phase AC currents are calculated by the phase current calculation processing and the three-phase AC current calculation processing executed at step S110a and S120a, respectively, in the following manner.

Figure 4:
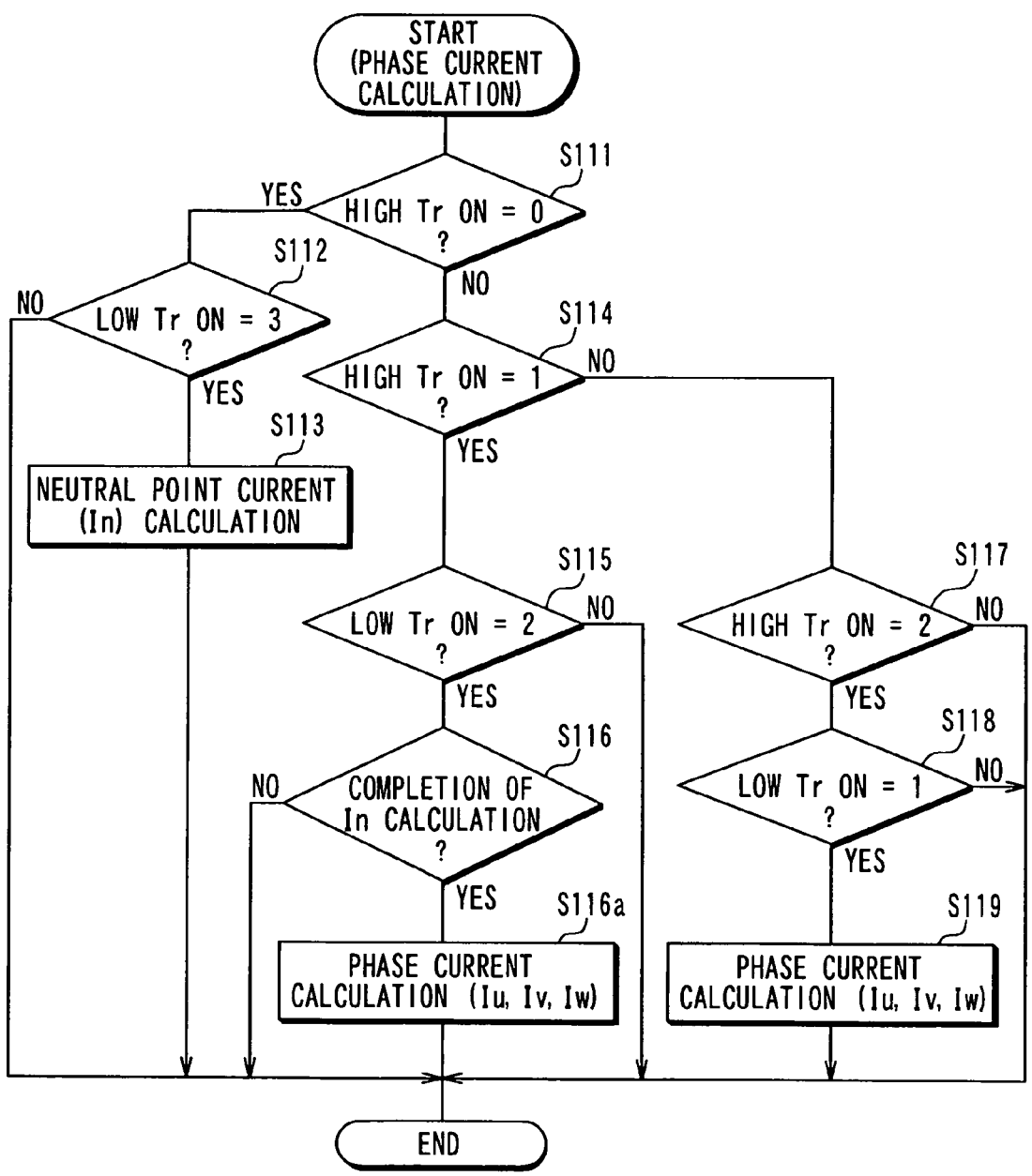
FIG. 4 is a flowchart of a part of steps executed in the processing shown in FIG. 3.

Details of the phase current calculation processing at step S110a is shown in FIG. 4.

In FIGS. 5 to 11, the inverter circuit 70 and the stator coil 31a are shown schematically, assuming that three transistors among six transistors 70a to 70f are in the turned-on state.

Figure 5:
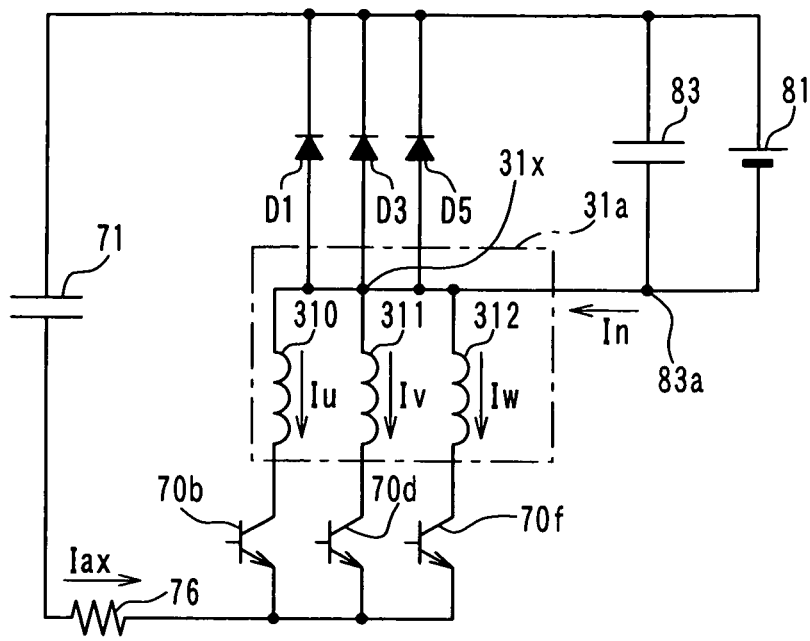
FIG. 5 is a circuit diagram showing a pattern of operation of each transistor of the inverter circuit shown in FIG. 2.

The transistors 70b, 70d and 70f are assumed to be in the turned-on state in FIG. 5. The transistors 70e, 70d and 70b are assumed to be in the turned-on state in FIG. 6. The transistors 70c, 70f and 70b are assumed to be in the turned-on state in FIG. 7. The transistors 70a, 70c and 70f are assumed to be in the turned-on state in FIG. 8. The transistors 70a, 70c and 70f are assumed to be in the turned-on state in FIG. 9. The transistors 70a, 70e and 70d are assumed to be in the turned-on state in FIG. 10. The transistors 70b, 70c and 70e are assumed to be in the turned-on state in FIG. 11. In FIGS. 5 to 11, an arrow indicates a positive direction of flow of a current Iax. In FIGS. 5 to 11, the other three transistors, which are in the turned-off state, and the discharge circuit are not shown for brevity.

The phase current calculation processing is executed in repetition as shown in FIG. 4.

At step S111, it is checked whether all the transistors 70a, 70c and 70e on the positive bus 75 side (high potential side) in the inverter circuit 70 are in the turned-off state. That is, it is checked whether the number of the transistors 70a, 70c and 70e in the turned-on state is zero (high Tr ON=0).

If all the transistors 70a, 70c and 70e are in the turned-off state, the check at step S111 results in YES.

At step S112, it is checked whether all the transistors 70b, 70d and 70f on the negative bus 74 side (low potential side) in the inverter circuit 70 are in the turned-on state (ON). That is, it is checked whether the number of the transistors 70b, 70d and 70f in the turned-on state is three (low Tr ON=3).

If all the transistors 70b, 70d and 70f are in the turned-on state, the check at step S112 results in YES.

If all the transistors 70a, 70c and 70e on the positive bus 75 side are in the turned-off state and all the transistors 70b, 70d and 70f on the negative bus 74 side are in the turned-on state as shown in FIG. 5, a current In flows in the resistor 76 as the current Iax. The current −In is a neutral point current, which flows between the neutral point 31x and a common junction 83a of the negative electrodes of the DC power source 81 and the smoothing capacitor 83. At step S113, the current Iax (=V/R), which flows in the resistor 76, is calculated by dividing the detection voltage V of the voltage sensor 77 by a resistance R of the resistor 76. Thus, the current −In is determined as the current Iax (=−In). The neutral point current In is calculated by multiplying the current −In by −1.

If at least one of the transistors 70a, 70c and 70e on the positive bus 75 side is in the turned-on state, the check at step S111 results in NO.

At step S114, it is checked whether only one of the transistors 70a, 70c and 70e on the positive bus 75 side is in the turned-on state (high Tr ON=1).

If only one of the transistors 70a, 70c and 70e on the positive bus 75 side is in the turned-on state, the check at step S114 results in YES.

At step S115, it is checked whether only two of the transistors 70b, 70d and 70f on the negative bus 74 side in the inverter circuit 70 are in the turned-on state (low Tr ON=2).

If only two of the transistors 70b, 70d and 70f on the negative bus 74 side are in the turned-on state, the check at step S115 results in YES.

At step S116, it is checked whether the neutral point current In has already been calculated. That is, it is checked at step S116 whether the calculation of the neutral point current In has been completed at step S113 prior to execution of step S116.

If the neutral point current In has already been calculated at step S113 before execution of step S116, the check at step S116 results in YES.

At step S116a, the phase currents are calculated by using the neutral point current In and the current Iax flowing in the resistor 76. The current Iax is calculated by dividing the detection voltage V of the voltage sensor 77 by the resistance R of the resistor 76.

Figure 6:
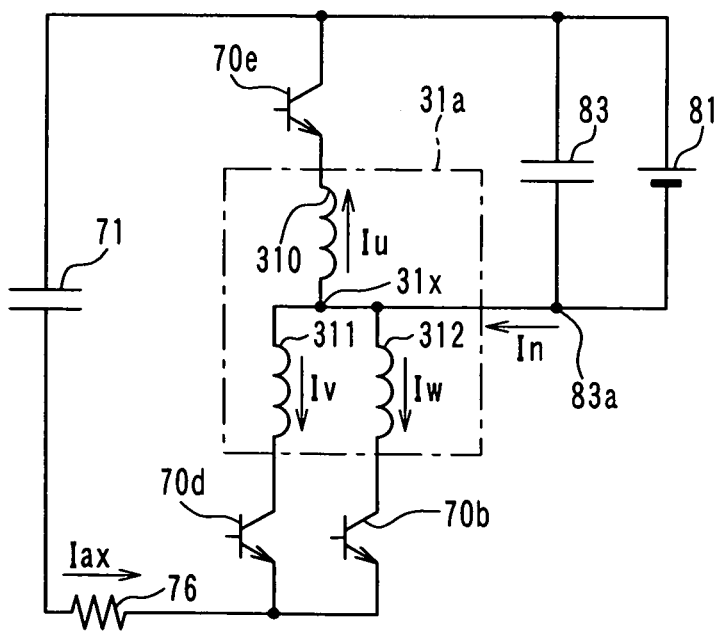
FIG. 6 is a circuit diagram showing a pattern of operation of each transistor of the inverter circuit shown in FIG. 2.

Specifically, if one transistor 70e on the positive bus 75 side is in the turned-on state and two transistors 70d and 70b on the negative bus 74 side are in the turned-on state as shown in FIG. 6, a current Iu−In flows in the resistor 76 as the current Iax. Therefore, at step S116a, the current Iu−In is calculated as the current Iax (=Iu−In) and the U-phase current Iu is calculated by adding the neutral point current In to the calculated current Iu−In.

Figure 7:
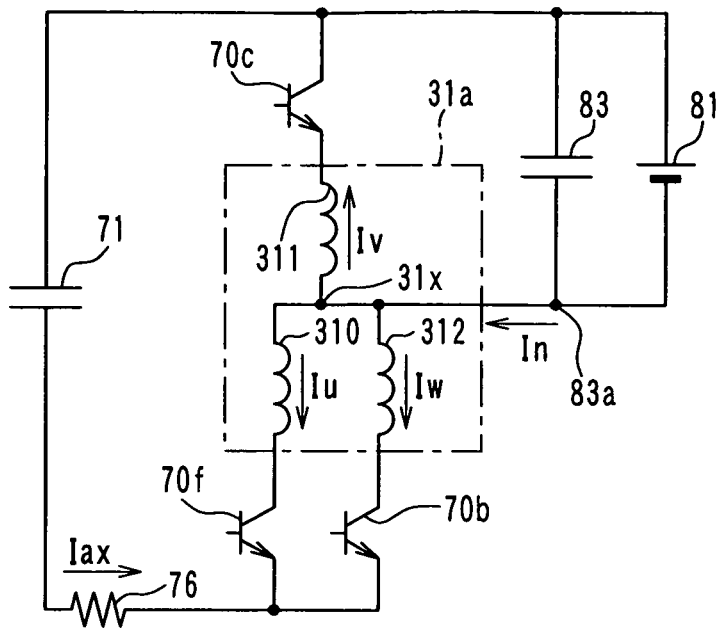
FIG. 7 is a circuit diagram showing a pattern of operation of each transistor of the inverter circuit shown in FIG. 2.

If one transistor 70c on the positive bus 75 side is in the turned-on state and two transistors 70f and 70b on the negative bus 74 side are in the turned-on state as shown in FIG. 7, a current Iv−In flows in the resistor 76 as the current Iax. Therefore, at step S116a, the current Iv−In is calculated as the current Iax (=Iv−In) and the V-phase current Iv is calculated by adding the neutral point current In to the calculated current Iv−In.

Figure 8:
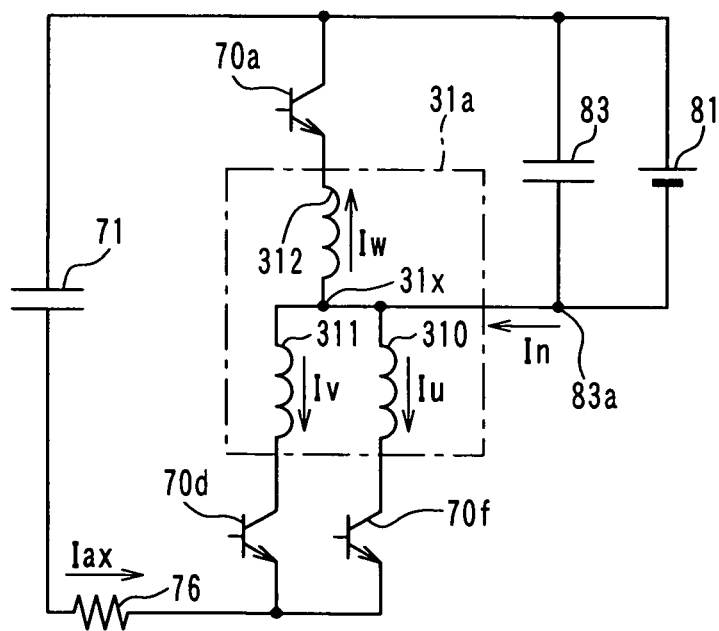
FIG. 8 is a circuit diagram showing a pattern of operation of each transistor of the inverter circuit shown in FIG. 2.

If one transistor 70a on the positive bus 75 side is in the turned-on state and two transistors 70d and 70f on the negative bus 74 side are in the turned-on state as shown in FIG. 8, a current Iw−In flows in the resistor 76 as the current Iax. Therefore, at step S116a, the current Iw−In is calculated as the current Iax (=Iw−In) and the W-phase current Iw is calculated by adding the neutral point current In to the calculated current Iw−In.

Thus the U-phase current Iu, the V-phase current Iv and the W-phase current Iw are calculated at step S116a.

If two of the transistors 70a, 70c and 70e on the positive bus 75 side are in the turned-on state, the check at step S114 results in NO.

At step S117, it is checked whether only two of the transistors 70a, 70c and 70e on the positive bus 75 side are in the turned-on state (high Tr ON=2).

If only two of the transistors 70a, 70c and 70e on the positive bus 75 side are in the turned-on state, the check at step S117 results in YES.

At step S118, it is checked whether only one of the transistors 70b, 70d and 70f on the negative bus 74 side is in the turned-on state (low Tr ON=1).

If only one transistor of the transistors 70b, 70d and 70f on the negative bus 74 side is in the turned-on state, the check at S118 results in YES.

At step S119, the phase currents are calculated by using the current Iax flowing in the resistor 76. The current Iax is calculated by dividing the detection voltage V of the voltage sensor 77 by the resistance R of the resistor 76.

Figure 9:
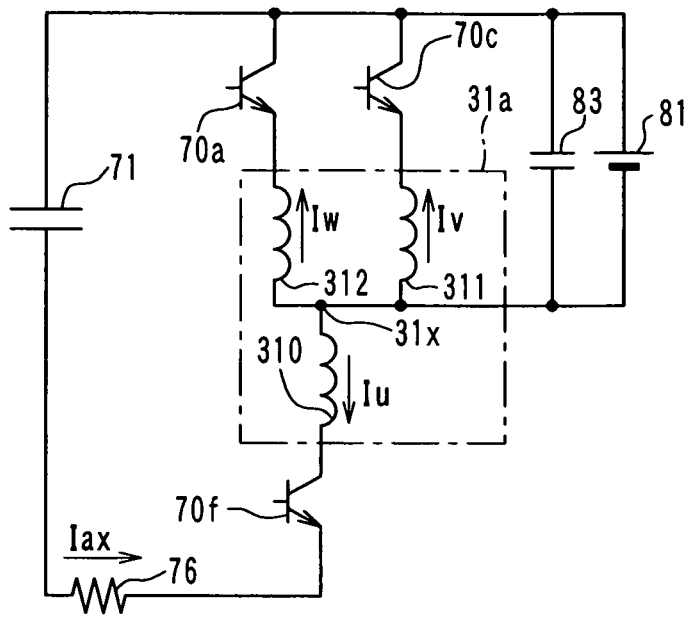
FIG. 9 is a circuit diagram showing a pattern of operation of each transistor of the inverter circuit shown in FIG. 2.

Specifically, if two transistors 70a and 70c on the positive bus 75 side are in the turned-on state and one transistor 70f on the negative bus 74 side is in the turned-on state as shown in FIG. 9, a current −Iu flows in the resistor 76 as the current Iax. Therefore, at step S119, the current −Iu is calculated as the current Iax (=−Iu). The U-phase current Iu is calculated by multiplying the calculated current −Iu by −1.

Figure 10:
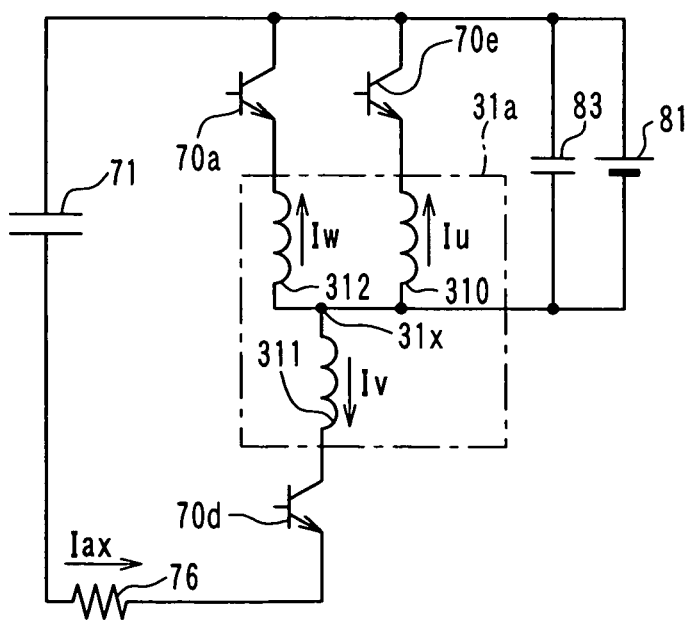
FIG. 10 is a circuit diagram showing a pattern of operation of each transistor of the inverter circuit shown in FIG. 2.

If two transistors 70a and 70e on the positive bus 75 side are in the turned-on state and one transistor 70d on the negative bus 74 side is in the turned-on state as shown in FIG. 10, a current −Iv flows in the resistor 76 as the current Iax. Therefore, at step S119, the current −Iv is calculated as the current Iax (=−Iv). The V-phase current Iv is calculated by multiplying the calculated current −Iv by −1.

Figure 11:
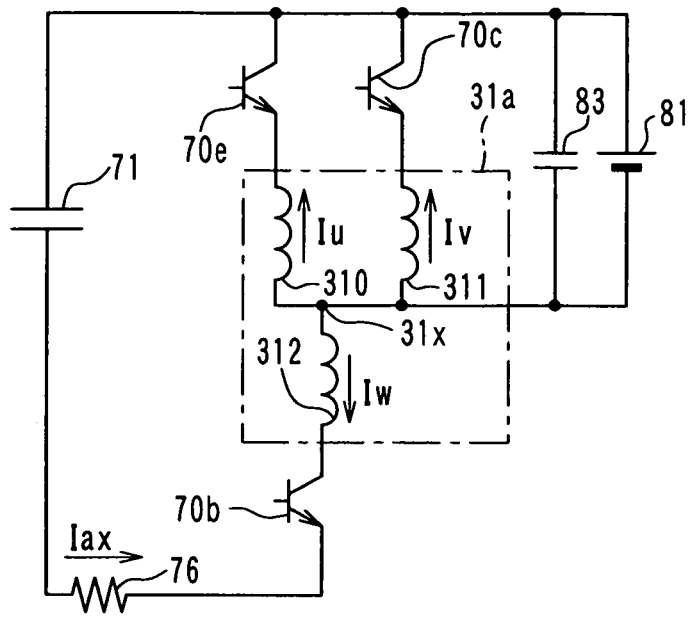
FIG. 11 is a circuit diagram showing a pattern of operation of each transistor of the inverter circuit shown in FIG. 2.

If two transistors 70c and 70e on the positive bus 75 side are in the turned-on state and one transistor 70b on the negative bus 74 side is in the turned-on state as shown in FIG. 11, a current −Iw flows in the resistor 76 as the current Iax. Therefore, at step S119, the current −Iw is calculated as the current Iax (=−Iw). The W-phase current Iw is calculated by multiplying the calculated current −Iw by −1.

Thus, the U-phase current Iu, the V-phase current Iv and the W-phase current Iw are calculated at step S119. If the neutral point current In has not been calculated at step S113 before the execution of step S116, the check at step S116 results in NO and step 116a is not executed.

By the repetition of the phase current calculation processing, one of the phase currents Iu, Iv and Iw is calculated at step S116a or S119.

Further, at steps S116a and S119, all the three phase currents Iu, Iv and Iw are calculated. Based on a set of the phase currents Iu, Iv and Iw calculated at steps S116a and S119, the three-phase AC currents are calculated at step S120a shown in FIG. 3.

Each time the phase currents are calculated at steps S116a and S119, the three-phase AC currents are updated.

That is, each time the phase currents Iu, Iv and Iw are calculated at step S110a by the execution of the motor rotation speed control processing, the three-phase AC currents are updated at step S120a.

It is assumed here that the number of times of execution of the motor rotation speed control processing (that is, phase current calculation processing) is indicated by a bracketed number. If the U-phase current Iu(1), the V-phase current Iv(2) and the W-phase current Iw(3) are calculated in the first, second and third execution of the motor rotation speed control processing, the three-phase AC currents are determined in the third execution of step S120a of the motor rotation control processing by setting the three currents Iu(1), Iv(2) and Iw(3).

If the U-phase current Iu(4) is calculated in the fourth execution of the motor rotation speed control processing, the three-phase AC currents are calculated by a set of the U-phase current Iu(4), which is a replacement of Iu(1), the V-phase current Iv(2) and the W-phase current Iw(3). Thus, the three-phase AC currents are updated.

(Discharge Control)

Figure 12:
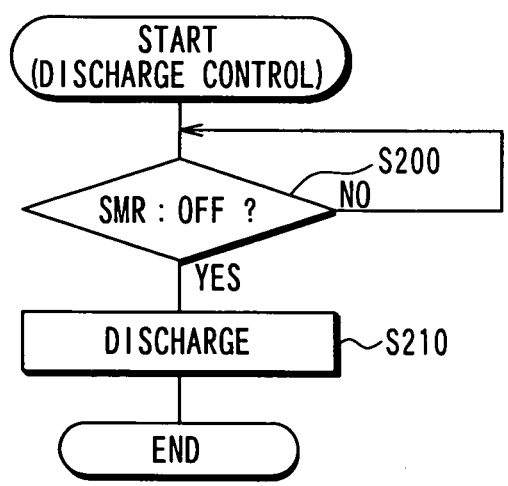
FIG. 12 is a flowchart of discharge control processing executed by the inverter control circuit shown in FIG. 2.

The inverter control circuit 72 further executes the capacitor discharge control processing as shown by a flowchart in FIG. 12.

At step S200, it is checked whether the system main relay (SMR) 82 is turned off. Specifically it is checked whether a main relay-off signal is received from the electronic control unit 90.

If the main relay-off signal is received from the electronic control unit 90, the check at step S200 results in YES, which indicates that the system main relay 82 is turned off.

At next step S210, all the transistors 70b, 70d and 70f on the negative bus 74 side are turned on, while turning off all the transistors 70a, 70c and 70e on the positive bus 75 side.

Figure 13:
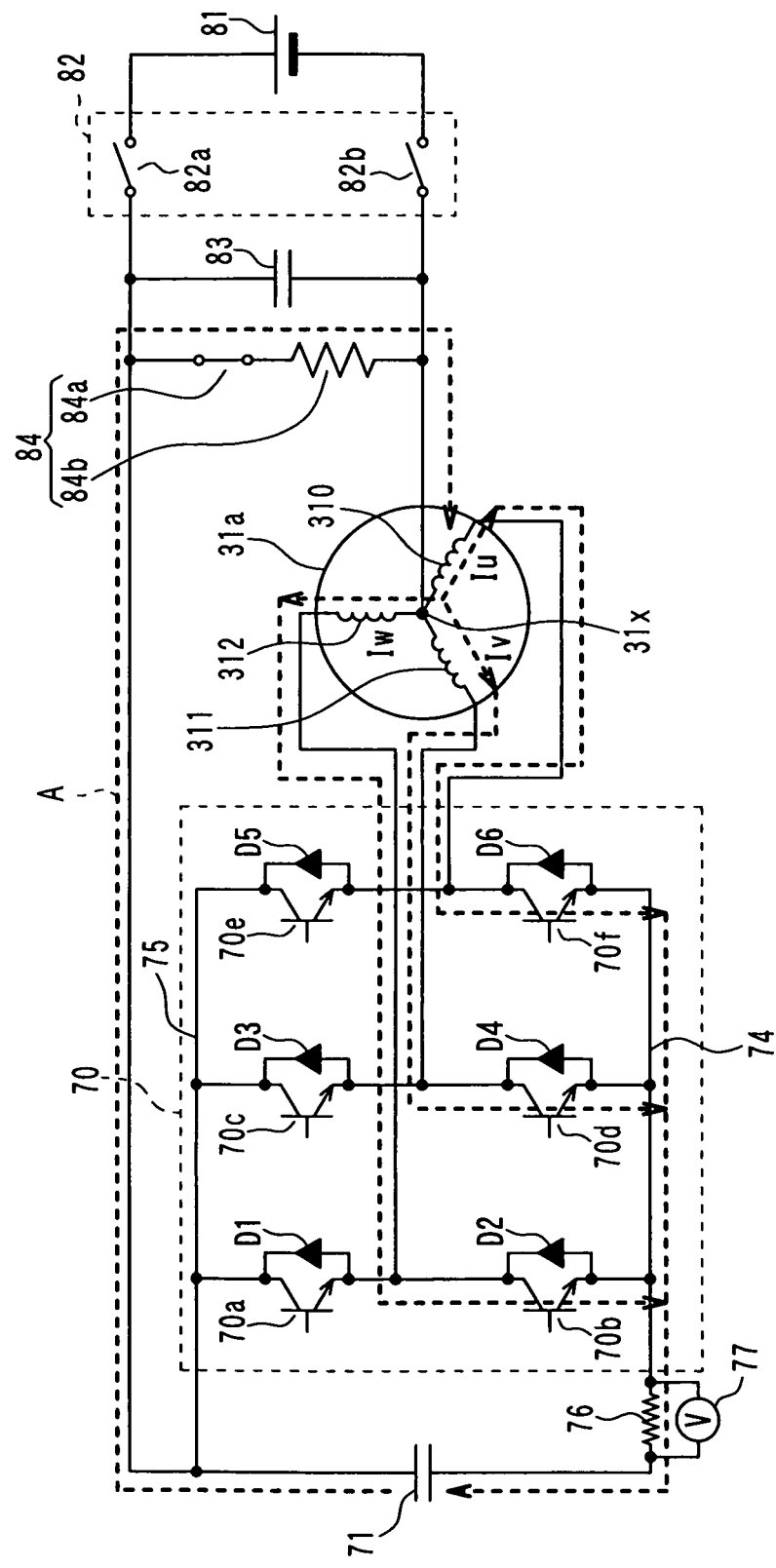
FIG. 13 is a circuit diagram showing a flow path of a current, which flows from a positive electrode to a negative electrode of a capacitor as a result of execution of the capacitor discharge control processing of FIG. 8.

In this instance, as shown by a thick chain line arrow A in FIG. 13, a current flows from the positive electrode of the power supply capacitor 71 to the neutral point 31x of the stator coil 31a through the relay switch 84a and the resistor 84b of the discharge circuit 84. This current is shunted to flow from the neutral point 31x to the W-phase coil 312, the V-phase coil 311 and the U-phase coil 310.

The current Iw flowing from the neutral point 31x to the W-phase coil 312 flows to the negative bus 74 through the transistor 70b. The current Iv flowing from the neutral point 31x to the V-phase coil 311 flows to the negative bus 74 through the transistor 70c. The current Iu flowing from the neutral point 31x to the U-phase coil 310 flows to the negative bus 74 through the transistor 70f.

The U-phase current Iu, the V-phase current Iv and the W-phase current Iw flowing to the negative bus 74 flow to the negative electrode of the power supply capacitor 71 through the resistor 76. Thus the electric charge is discharged from the power supply capacitor 71.

If no main relay-off signal is received from the electronic control unit 90, the check at step S200 results in NO indicating that the system main relay 82 is in the turned-off state.

In the driving apparatus 50 according to the first embodiment described above, the power supply capacitor 71 is connected between the positive bus 75 and the negative bus 74, and the DC power source 81 is connected between the positive bus 75 and the neutral point 31x. The inverter circuit 70 outputs the three-phase AC currents from the common junctions T1, 12 and T3 to the stator coil 31a by the switching operation of the transistors 70a to 70f based on the output voltages of the DC power source 81 and the power supply capacitor 71. The rotating magnetic field is thus generated from the stator coil 31a.

The inverter control circuit 72 checks whether the main relay-off signal is received from the electronic control unit 90 to check whether the system main relay 82 is turned off.

The electronic control unit 90 outputs the main relay-off signal to the inverter control circuit 72 as a result of determination that the hybrid vehicle has received a collision impact from the other vehicle, for example.

Upon receiving the main relay-off signal from the electronic control unit 90, the inverter control circuit 72 determines that the system main relay 82 is turned off by the electronic control unit 90. The inverter control circuit 72 thus turns off the transistors 70a, 70c and 70e and turns on the transistors 70b, 70d and 70f as shown in FIG. 13.

Thus, a discharge current flows from the positive electrode to the negative electrode of the power supply capacitor 71 through the stator coil 31a and the transistors 70b, 70d and 70f on the negative bus 74, thereby discharging the electricity stored in the power supply capacitor 71.

Even when the compressor housing 20, the driving apparatus 50 and/or the cover 60 is broken by an accident such as a collision and the positive electrode of the power supply capacitor 71 accidentally contacts the compressor housing 20 or the like, passengers in the hybrid vehicle is protected from receiving electric shock.

According to the first embodiment, the transistors 70b, 70d and 70f on the negative bus 74 side are turned on to allow the current to flow from the positive electrode to the negative electrode of the power supply capacitor 71 of so that the electric charge in the power supply capacitor 71 is thereby discharged.

The current, which flows to the transistors 70b, 70d and 70f on the negative bus 74 side, is limited by the resistance of the stator coil 31a. It is thus prevented that a failure arises due to an increase of the currents flowing to the transistors 70b, 70d and 70f on the negative bus 74 side.

In addition, the discharge circuit 84 has the resistor 84b, which is provided in the current path between the positive electrode and the negative electrode of the power supply capacitor 71. As a result, the current flowing to the transistors 70b, 70d and 70f on the negative bus 74 side is more limited to protect the transistors 70b, 70d and 70f.

In the first embodiment, the current may be allowed to flow from the positive electrode side to the negative electrode side through the stator coil 31a in the following manner.

As one modification, only one and the other two of the transistors 70b, 70d and 70f on the negative bus 74 side may be turned off and on, respectively, while turning off the transistors 70a, 70c and 70e on the positive bus 75. As another modification, only two and the other one of the transistors 70b, 70d and 70f on the negative bus 74 side may be turned off and on, respectively, while turning off the transistors 70a, 70c and 70e on the positive bus 75.

In the first embodiment, the resistor 76 may be connected between the positive electrode of the power supply capacitor 71 and the positive bus 75. In this instance, the phase current is detected in the phase current calculation processing by the current Iax, which flows in the resistor 76 when one of the transistors 70*a*, 70*c* and 70*e* on the positive bus 75 side is turned on and two of the transistors 70*b*, 70*d* and 70*f* on the negative bus 74 side are turned on.

In the first embodiment, the electronic control unit 90 may output the main relay-off signal to the inverter control circuit 72 by using a voltage sensor, which detects a voltage between the positive electrode and the negative electrode of the capacitor 82.

In this instance, the electronic control unit 90 may check whether the system main relay 82 is turned off by checking whether the detection voltage of such a voltage sensor is less than a predetermined level. If the detection voltage is less than the predetermined level, the main relay-off signal may be outputted to the inverter control circuit 72.

Second Embodiment

According to the second embodiment, the inverter control circuit 72 is configured to gradually decrease the rotation speed of the electric motor 30 before stopping the electric motor 30.

The second embodiment is different from the first embodiment in the motor rotation speed control processing.

Figure 14:
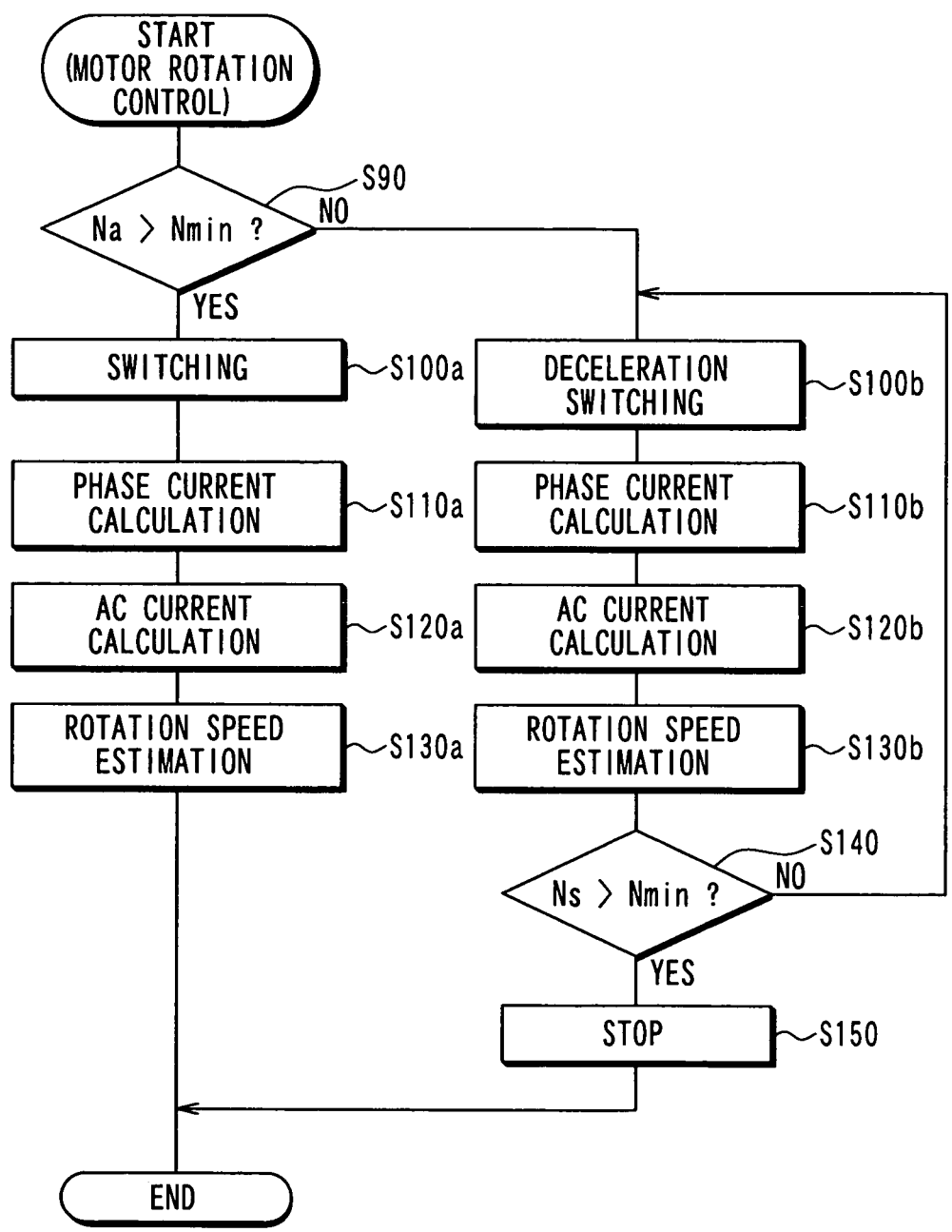
FIG. 14 is a flowchart of motor rotation speed control processing executed by an inverter control circuit in a second embodiment of the present invention.

Specifically, as shown in FIG. 14, this motor rotation speed control processing has steps S90, S100*b*, S110*b*, S120*b*, S130*b*, S140 and S150 added to the steps shown in FIG. 3. The inverter control circuit 72 executes the motor rotation speed control processing as follows.

At step S90, it is checked whether the command rotation speed Na outputted from the electronic control unit 90 is higher than a low limit speed Nmin of the rotation speed of the electric motor 30. The low limit speed Nmin is set to be higher than zero but the lowest possible speed, at which the electric motor 30 rotates. If the command rotation speed Na is higher than the low limit speed Nmin (that is, Na>Nmin), the check at step S90 results in YES.

Nest, at step S100*a*, the transistors 70*a* to 70*f* are switching-controlled so that the rotation speed of the electric motor 30 approaches the command rotation speed Na.

At next step S110*a*, one of the phase currents among the W-phase current Iw, the V-phase current Iv and the U-phase current Iu is calculated.

At step S120*a*, the three-phase AC currents are calculated, based on the phase currents Iw, Iv and Iu calculated at step S110*a*.

At step S130*a*, the estimated rotation speed Ns of the electric motor 30 is calculated based on the angular velocity of the three-phase AC currents calculated at step 120*a*.

As long as the command rotation speed Na received from the electronic control unit 90 is higher than the low limit speed Nmin (Na>Nmin), the steps S100*a* to S130*a* are repeated.

In this case, at step S100*a*, the transistors 70*a* to 70*f* are switching-controlled to reduce the difference between the estimated rotation speed Ns and the command rotation speed Na. Following step S100*a*, steps S110*a*, S120*a* and S130*a* are repeated for the phase current calculation, the three-phase AC current calculation and the rotation speed estimation, respectively. The transistors 70*a* to 70*f* are thus controlled to switch over to turn on and off to control the rotation speed of the rotation shaft 32*a* of the electric motor 30.

If the command rotation speed Na outputted from the electronic control unit 90 is lower than the low limit speed Nmin (Na<Nmin), the check at step S90 results in NO. In this case, the rotation speed of the electric motor 30 is decreased gradually to the low limit speed by steps S100*b*, S110*b*, S120*b*, S130*b* and S140.

Specifically, as step S100*b*, the transistors 70*a* to 70*f* are switching-controlled to decrease the rotation speed of the electric motor 30 by a fixed decrement of ΔN to decelerate the electric motor 30.

Specifically, the frequency of the three-phase AC currents, which flow from the common junctions T1 to T3 to the stator coil 31*a*, is decreased. The speed of rotation of the rotating magnetic field generated by the stator coil 31*a* is decreased. As a result, the rotation speed of the rotor 32 is responsively decreased.

At next step S110*b*, one of the W-phase current Iw, the V-phase current Iv and the U-phase current Iu is calculated. This phase current may be calculated in the same manner as step at S110*a*.

At step S120*b*, the three-phase AC currents are calculated based on the phase currents calculated at step S110*b*. The three-phase AC currents may be calculated in the same manner as at step S120*a*.

At step 130*b*, the estimated rotation speed Ns of the electric motor 30 is calculated based on the angular velocity of the three-phase AC currents calculated at step S120*b*.

At step S140, it is checked whether the estimated speed Ns is lower than the low limit speed Nmin. If the estimated speed Ns is equal to or higher than the low limit speed Nmin (that is, Ns>Nmin), the check result at step S140 results in NO.

Steps S100*b* to S130*b* are repeated, as long as the estimated rotation speed Ns is equal to or higher than the low limit speed Nmin. Each time step S100*b* is executed, the frequency of the three-phase AC currents outputted from the common junctions T1, T2 and T3 to the stator coil 31*a* is decreased. As a result, the rotation speed of the electric motor 30 is gradually decreased to the low limit speed Nmin.

The induced voltage of the stator coil 31*a* is increased in proportion to the rotation speed of the electric motor 30. That is, as the rotation speed of the electric motor 30 rises, the voltage induced by the stator coil 31*a* rises. As the rotation speed of the electric motor 30 falls, the voltage induced by the stator coil 31*a* falls. Therefore, by gradually decreasing the rotation speed of the electric motor 30, the induced voltage of the stator coil 31*a* is gradually decreased.

If the estimated rotation speed Ns estimated at step S130 is lower than the low limit speed Nmin (that is, Ns<Nmin), the check at step S140 results in YES.

In this case, at step S150, all the transistors 70*a* to 70*f* are turned off thereby to stop flow of the three-phase AC currents from the common junctions T1, 12 and T3 to the stator coil 31*a*. As a result, the rotation of the rotor 32 is stopped.

According to the second embodiment, by determining NO at step S90 when the command rotation speed Na received from the electronic control unit 90 is lower than the low limit speed Nmin of the electric motor 30, the inverter control circuit 72 gradually decreases the rotation speed of the electric motor 30 to the low limit speed Nmin before the electric motor 30 is stopped. As a result, the induced voltage of the stator coil 31*a* is gradually decreased as the electric motor 30 is decelerated. That is, a period for decreasing the induced voltage is provided as a voltage induction decreasing period before the electric motor 30 is stopped.

The electricity charged from the stator coil 31*a* to the power supply capacitor 71 at the time of the transistor 70*b* (70*d*, 70*f*) on the negative bus 74 side is decreased as the induced voltage of the stator coil 31*a* is decreased.

Therefore, in the voltage induction decreasing period, the power supply capacitor 71 repeats discharging and charging the electric charge so that the electric charge charged from the stator coil 31a to the power supply capacitor 71 is gradually decreased.

Thus, the electric charge stored in the power supply capacitor 71 after the electric motor 30 is stopped is decreased in comparison to a case, in which the electric motor 30 is stopped immediately after the inverter control circuit 72 is commanded by the electronic control unit 90 to stop the electric motor 30, that is, immediately after the check at step S90 (FIG. 14) results in NO.

If the capacitor discharge control processing of FIG. 12 is executed after the electric motor 30 is stopped, the electric charge is discharged from the power supply capacitor 71. However, in comparison to the case that the electric motor 30 is stopped immediately after the inverter control circuit 72 determines NO at step S90, the electric charge discharged from the power supply capacitor 71 is decreased. As a result, the power supply capacitor 71 discharges its stored electricity in a short time.

It is thus prevented that the electricity stored in the power supply capacitor 71 adversely affect passengers.

In the second embodiment, the inverter circuit 72 may be modified to stop the electric motor 30 without comparison of the command rotation speed Na with the low limit speed Nmin.

The inverter control circuit 72 may check whether a motor stop command is received from the electronic control unit 90 based on a drive permission signal outputted from the electronic control unit 90.

Specifically, the inverter control circuit 72 may determine that a motor drive command is received from the electronic control unit 90 when the drive permission command is outputted from the electronic control unit 90. In this case, the inverter control circuit 72 controls the rotation of the electric motor 30 in accordance with the command value of rotation speed of the electric motor 30 received from the electronic control unit 90.

The inverter control circuit 72 determines that it received a command from the electronic control unit 90 to stop the electric motor 30, when the electronic control unit 90 stops outputting the drive permission signal.

Third Embodiment

According to the third embodiment, it is checked whether the system main relay 82 is turned off based on a voltage developed between the positive bus 75 and the neutral point 31x of the stator coil 31a without referring to the main relay-off signal.

Figure 15:
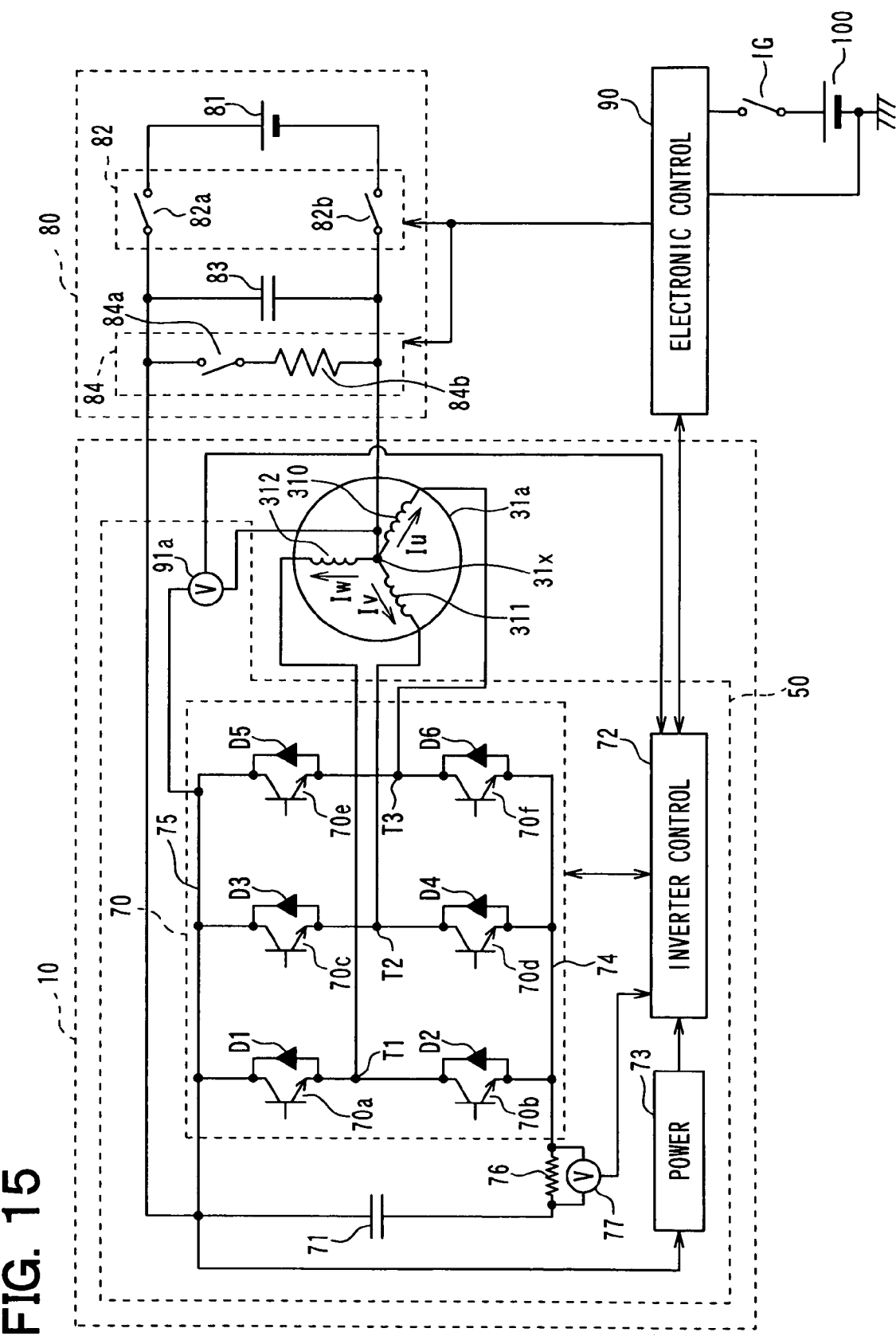
FIG. 15 is an electric circuit diagram of the driving apparatus and the electric power source unit in a third embodiment of the present invention.

In the third embodiment, as shown in FIG. 15, the driving apparatus 50 shown in FIG. 2 is further provided with a voltage sensor 91a. The voltage sensor 91a detects the voltage developed between the positive bus 75 and the neutral point 31x of the stator coil 31a. The detection voltage of the voltage sensor 91a is used to check whether the system main relay 82 is turned off by the inverter control circuit 72.

The inverter control circuit 72 is configured to execute step S200 shown in FIG. 12 in a different manner.

Specifically, in operation, the electronic control unit 90 turns off the relay switch 84a of the discharge circuit 84 and turns on the switches 82a and 82b of the system main relay 82, when the ignition switch IG is turned on.

The positive electrode of the DC power source 81 and the positive electrode of the smoothing capacitor 83 are thus connected. Further, the negative electrode of the DC power source 81 and the negative electrode of the smoothing capacitor 83 are connected.

The output voltage of the DC power source 81 is supplied between the neutral point 31x and the positive bus 75.

The inverter control circuit 72 checks at step S200 in FIG. 12 whether the detection voltage of the voltage sensor 91a is lower than a predetermined voltage. Thus, it is checked whether the system main relay 82 (SMR in FIG. 12) is turned on.

If the output voltage of the DC power source 81 is supplied between the neutral point 31x and the positive bus 75, the voltage between the neutral point 31x and the positive bus 75 becomes higher than the predetermined voltage. That is, the detection voltage of the voltage sensor 91a becomes higher than the predetermined voltage. The check at step S200 therefore results in NO, which indicates that the system main relay 82 is in the turned-on state.

The electronic control unit 90 turns off the switches 82a and 82b of the system main relay 82 and turns on the relay switch 84a of the discharge circuit 84, when it is determined that the hybrid vehicle had an impact of collision with the other vehicle.

The positive electrode of the DC power source 81 and the positive electrode of the smoothing capacitor 83 are disconnected from each other. The negative electrode of the DC power source 81 and the negative electrode of the smoothing capacitor 83 is also disconnected. The output voltage of the DC power source 81 is not supplied to the inverter control circuit 72.

With the turning-on of the relay switch 84a of the discharge circuit 84, a current flows from the positive electrode of the smoothing capacitor 83 to the negative electrode of the same through the relay switch 84a and the resistor 84b.

As a result, the voltage between the positive electrode and the negative electrode of the smoothing capacitor 83 is decreased gradually. The voltage between the positive bus 75 and the neutral point 31x of the stator coil 31a responsively decreases gradually. The detection voltage of the voltage sensor 91a falls to be lower than the predetermined voltage in the end.

The check at step S200 executed by the inverter control circuit 72 results in YES, which indicates that the system main relay 82 is turned off.

According to the third embodiment, the voltage between the positive bus 75 and the neutral point 31x of the stator coil 31a fluctuates in correspondence to the turning-on and turning-off of the system main relay 82. The inverter control circuit 72 thus can check whether the system main relay 82 is turned off, based on the voltage supplied between the positive bus 75 and the neutral point 31x of the stator coil 31a and detected by voltage sensor 91a.

Fourth Embodiment

According to the fourth embodiment, the current is caused to flow from the positive electrode to the negative electrode of the power supply capacitor 71 in discharging the power supply capacitor 71.

The power source unit 80 has no discharge unit 84, which is shown in FIG. 2.

The fourth embodiment operates differently from the first embodiment in that step S210 shown in FIG. 12 is executed differently by the inverter control circuit 72.

Figure 16:
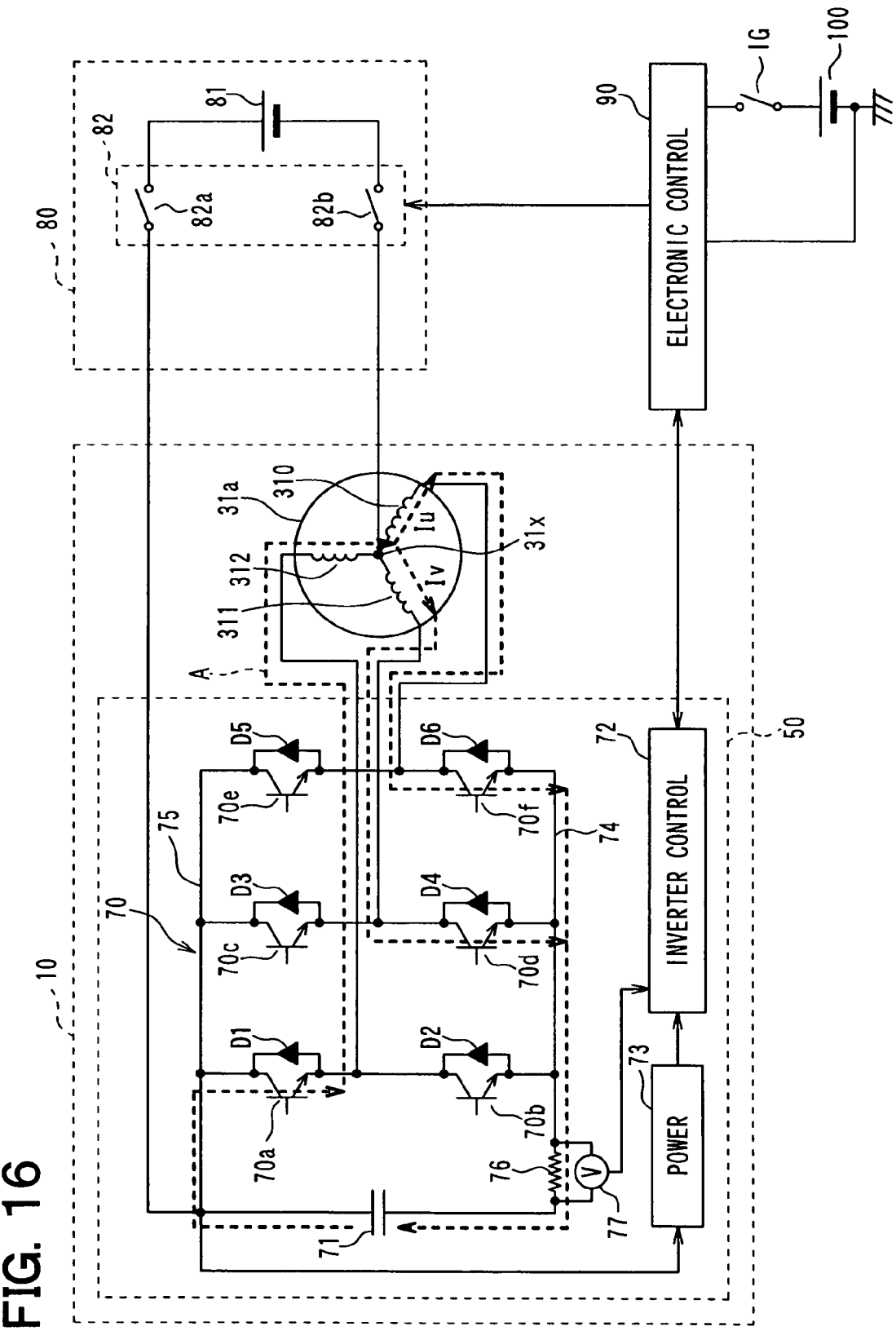
FIG. 16 is an electric circuit diagram of the driving apparatus and the electric power source unit in a fourth embodiment of the present invention.

Specifically as shown in FIG. 16, at step S210 in FIG. 12, the transistors 70a, 70d and 70f are turned on while turning off the transistors 70b, 70c and 70e.

As a result, as shown by the thick chain line arrow A, the current flows from the positive electrode of the power supply capacitor 71 to the neutral point 31x of the stator coil 31a through the transistor 70a and the W-phase coil 312. This current is shunted to the V-phase current Iv and the U-phase current Iu from the neutral point 31x.

The V-phase current Iv flows from the neutral point 31x to the negative bus 74 through the V-phase coil 311 and the transistor 70d. The U-phase current Iu flows from the neutral point 31x to the negative bus 74 through the U-phase coil 310 and the transistor 70f.

Thus, the U-phase current Iu and the V-phase current Iv flow to the negative electrode of the power supply capacitor 71 through the resistor 76. The electric charge is discharged from the power supply capacitor 71.

In the fourth embodiment, the power supply capacitor 71 may be discharged in the different way, while still discharging the power supply capacitor 71 from the positive electrode to the negative electrode of the power supply capacitor 71 through the transistors of the inverter circuit 70 and the stator coil 31a.

Specifically, the transistor 70c and 70e on the positive bus 75 may be turned on in place of the transistor 70a and the transistor 70b on the negative bus 74 may be turned on in place of the transistors 70d and 70f.

Fifth Embodiment

According to the fifth embodiment, the inverter control circuit 72 is not supplied with the electric power by the power source 73, which is shown in FIG. 2 for example.

Figure 17:
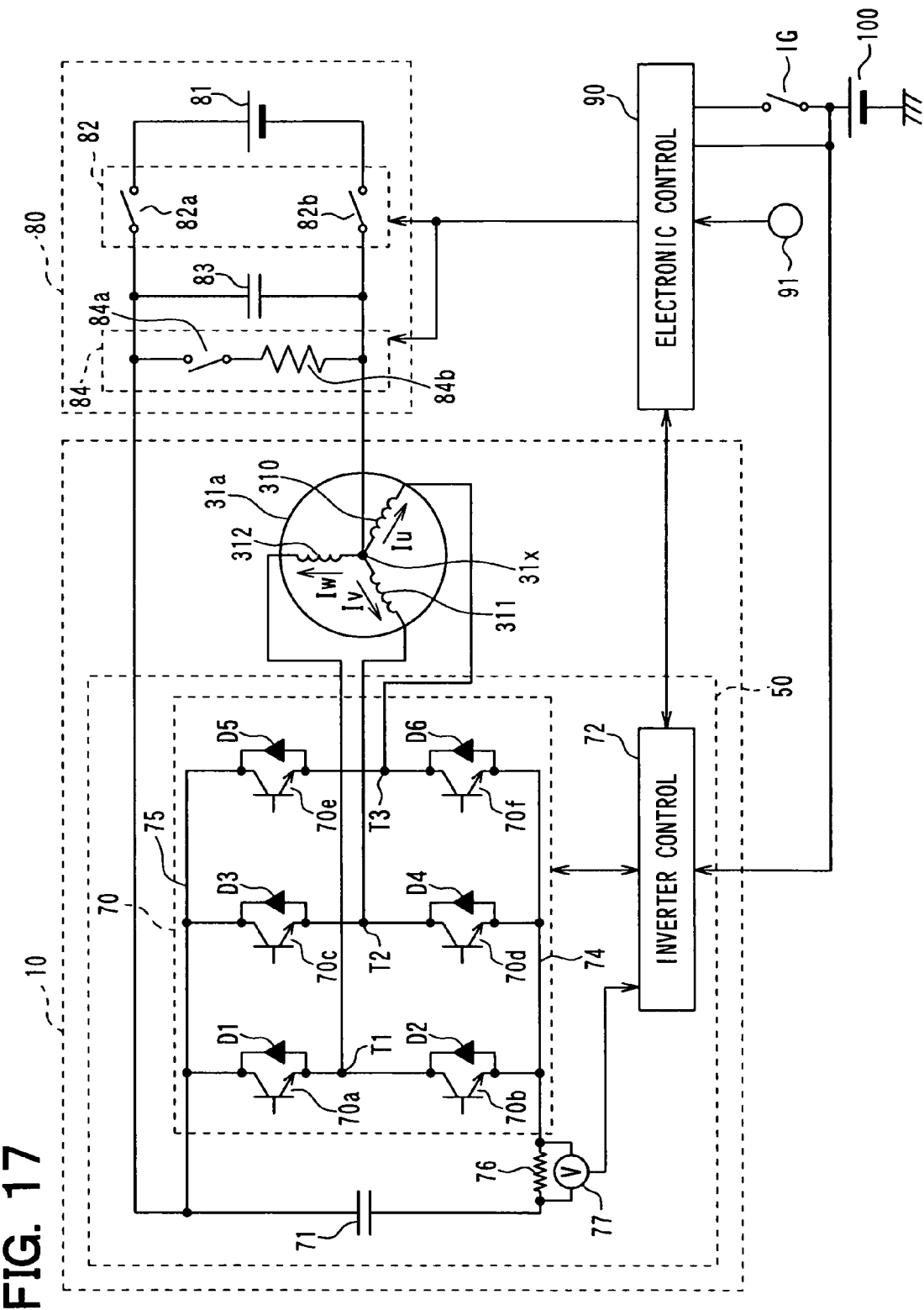
FIG. 17 is an electric circuit diagram of the driving apparatus and the electric power source unit in a fifth embodiment of the present, invention.

The inverter control circuit 72 is supplied with the electric power from the DC power source 100 in place of the power source 73, as shown in FIG. 17. The inverter control circuit 72 is operable independently of the voltage between the positive bus 75 and the neutral point 31x.

Sixth Embodiment

Figure 18:
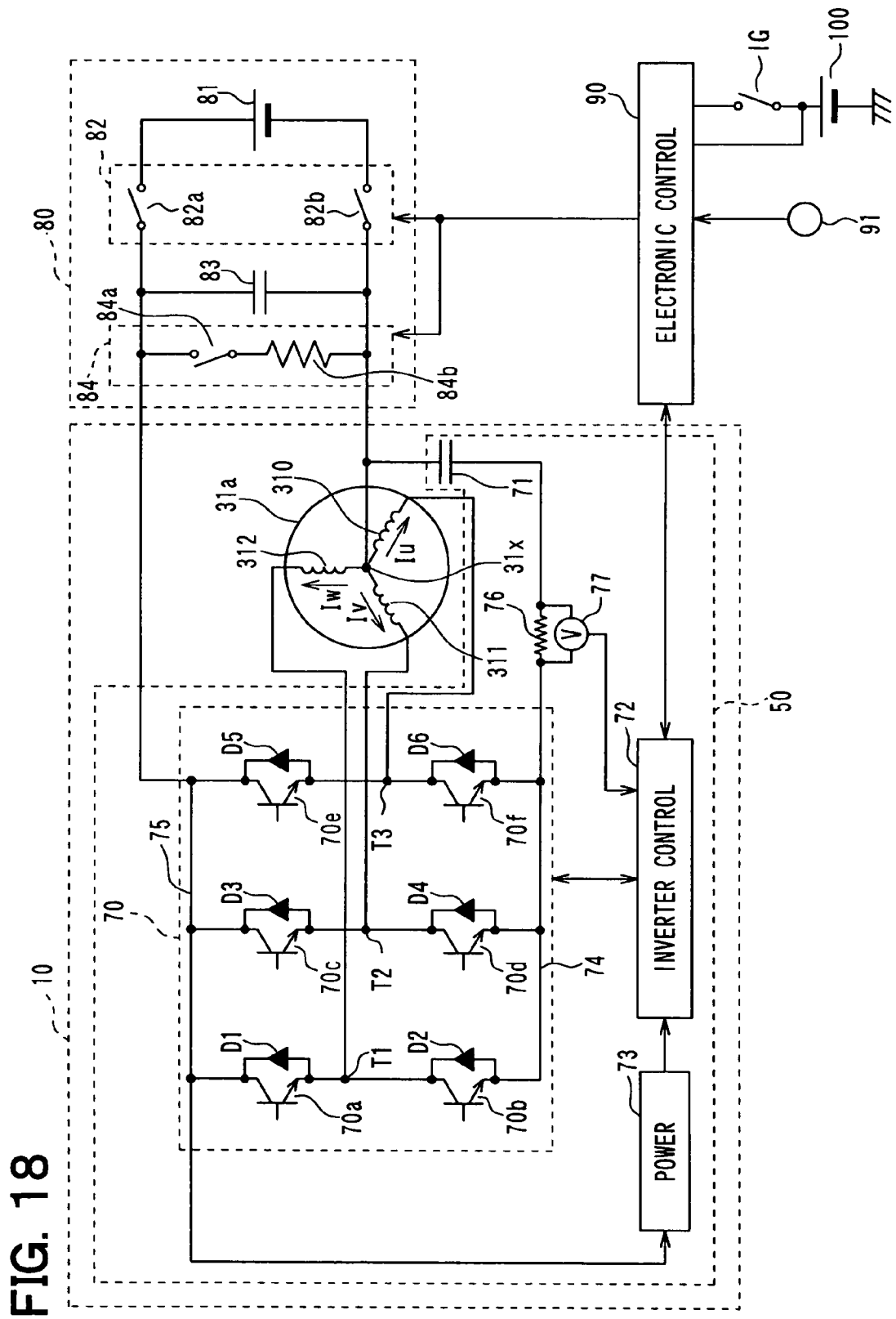
FIG. 18 is an electric circuit diagram of the driving apparatus and the electric power source unit in a sixth embodiment of the present invention.

According to the eighth embodiment, the driving apparatus 50 is configured to have the power supply capacitor 71 between the neutral point 31x of the stator coil 31a and the negative bus 74 as shown in FIG. 18.

The inverter control circuit 72 of the driving unit 50 is configured to execute the motor rotation speed control processing in the similar manner as in the first embodiment.

Figure 19:
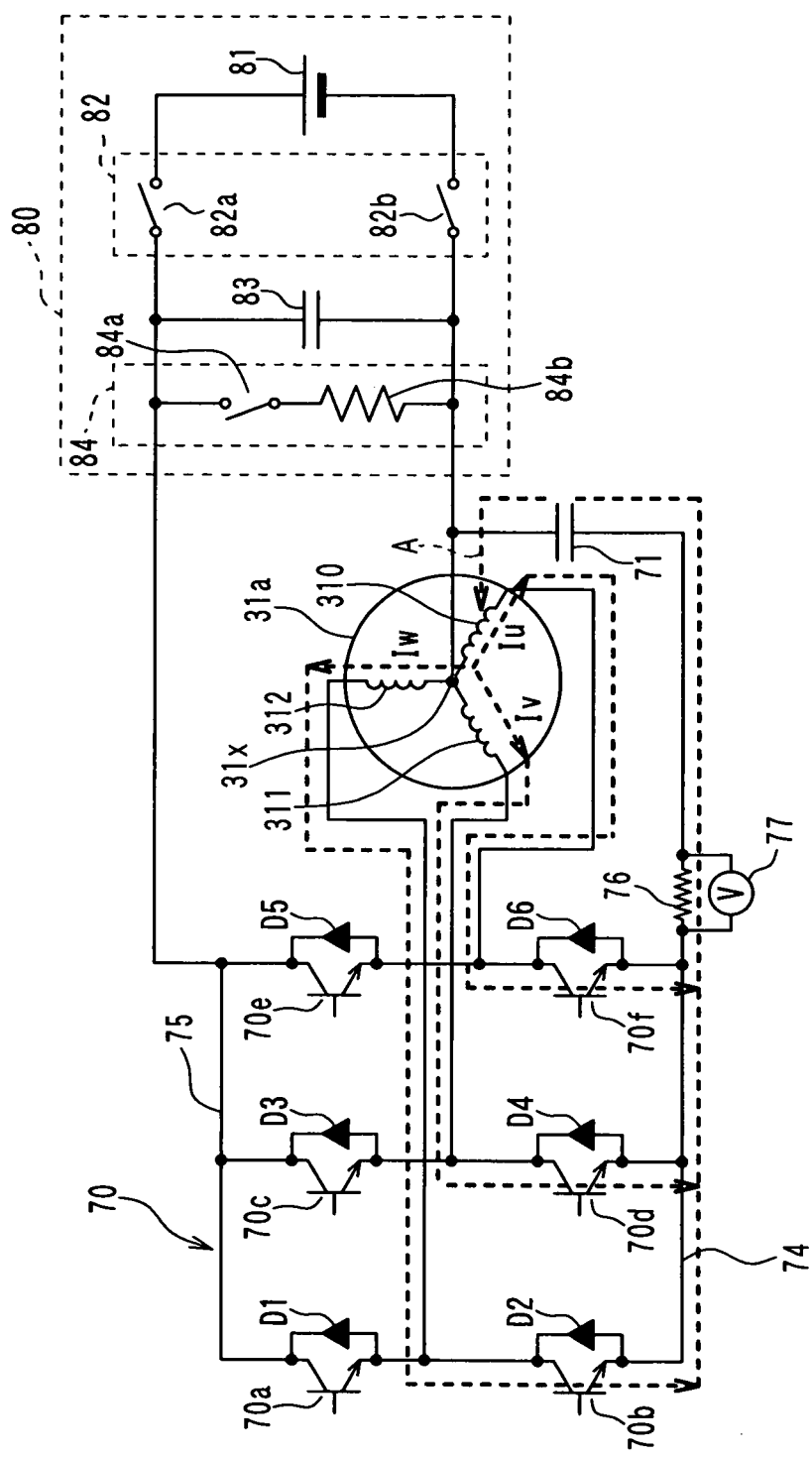
FIG. 19 is a circuit diagram showing a flow path of a current, which flows from a positive electrode to a negative electrode of a capacitor in the sixth embodiment.

Furthermore, the inverter control circuit 72 is configured to execute the capacitor discharge control processing in the similar manner as in the first embodiment. However, the power supply capacitor 71 is discharged through a different current flow path when step S210 of FIG. 12 is executed. The flow path of the discharge current from the power supply capacitor 71 is shown in FIG. 19.

At step S210, all the transistors 70b, 70d and 70f on the negative bus 74 side are turned on, while turning off all the transistors 70a, 70c and 70e on the positive bus 75 side.

As a result, as indicated by the arrow A in thick chain line, the current flows into the neutral point 31x of the stator coil 31a from the positive electrode of the power, supply capacitor 71. This current is shunted into the W-phase current Iw, the V-phase current Iv and the U-phase current Iu.

The W-phase current Iw flows to the negative bus 74 through the transistor 70b. The V-phase current Iv flows to the negative bus 74 through the transistor 70d. The U-phase current Iu flows to the negative bus 74 through the transistor 70f. The current Iu, the V-phase current Iv and the W-phase current Iw flowing to the negative bus 74 flow to the negative electrode of the power supply capacitor 71 through the resistor 76. The electric charge is thus discharged from the power supply capacitor 71.

According to the sixth embodiment, the inverter control circuit 72 turns off the transistors 70a, 70c and 70e, and turns on the transistors 70b, 70d and 70f at step S210. Thus, the discharge current is allowed to flow from the positive electrode of the power supply capacitor 71 to the negative electrode of the same through the stator coil 31a, thereby discharging the power supply capacitor 71 in the similar manner as in the first embodiment.

In this operation, regardless of the discharge circuit 84, the current is allowed to flow from the positive electrode of the power supply capacitor 71 to the negative electrode. For this reason, even if the electric power unit 80 is not provided with the discharge circuit 84, the capacitor discharge control can be performed.

In the sixth embodiment, in place of the power source 73, a DC power source 100 may be provided to supply the electric power to the inverter control circuit 72 as in the fifth embodiment (FIG. 17). The DC power source 100 is independent of the voltage developed between the positive bus 75 and the neutral point 31x.

The inverter control circuit 72 may check whether the system main relay 82 is turned on based on the voltage between the positive bus 75 and the neutral point 31x of the stator coil 31a as in the second embodiment.

Specifically, the voltage sensor which detects the voltage between the positive bus 75 and the neutral point 31x of the stator coil 31a is added to the driving apparatus 50. The inverter control circuit 72 checks whether the system main relay 82 is turned on by checking whether the detection voltage of the voltage sensor is lower than the predetermined voltage.

In place of turning on all the three transistors 70b, 70d and 70f on the negative bus 74, only one of the transistors 70b, 70d and 70 may be turned on while turning off the other two transistors. Alternatively, two of the transistors 70b, 70d and 70f may be turned on while turning off the other one transistor.

Seventh Embodiment

Figure 20:
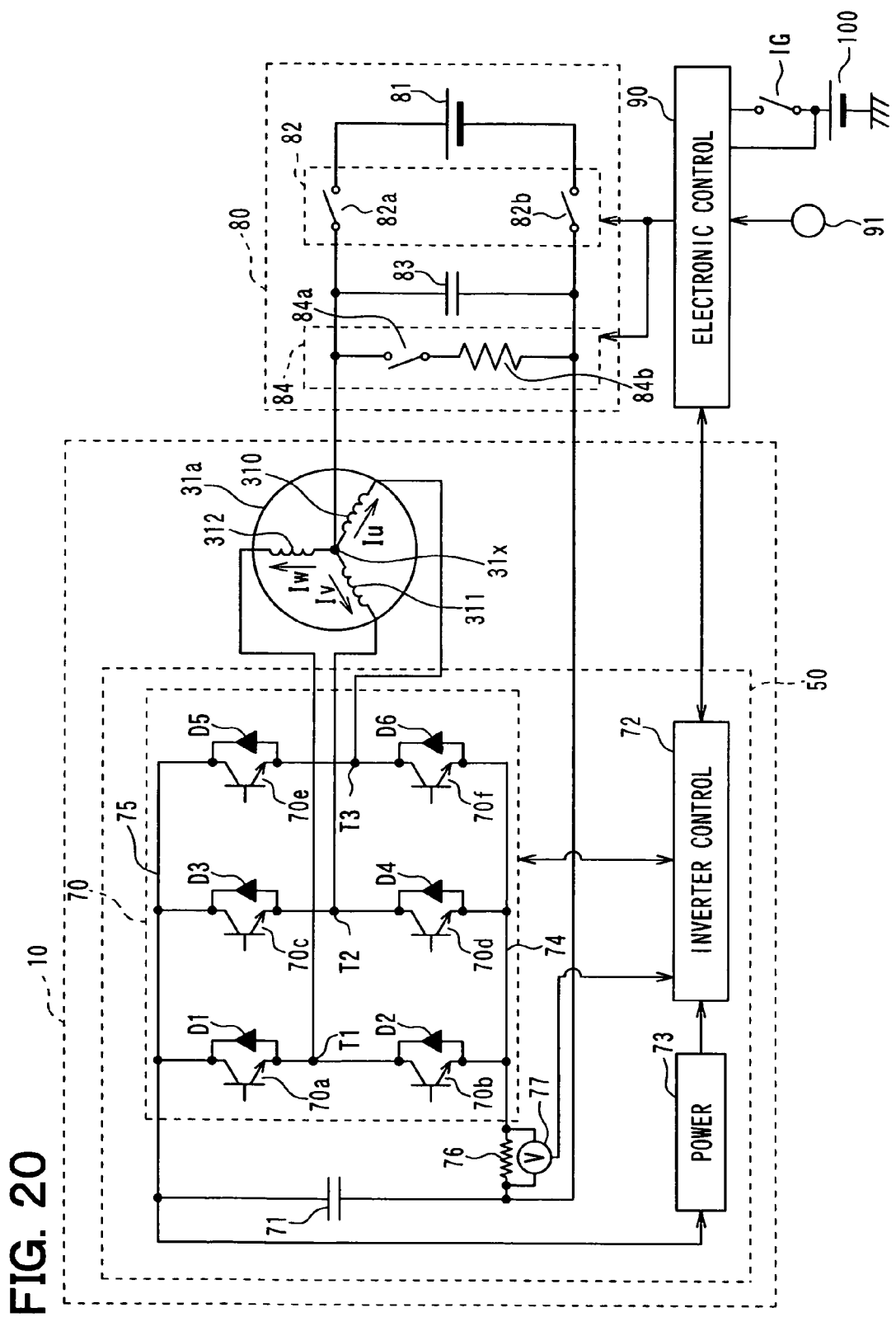
FIG. 20 is an electric circuit diagram of the driving apparatus and the electric power source unit in a seventh embodiment of the present invention.

According to the seventh embodiment, differently from the first embodiment, the electric power unit 80 is connected between the negative electrode of the power supply capacitor 71 and the neutral point 31x of the stator coil 31a as shown in FIG. 20.

The positive electrode of the DC power source 81 is connected to the neutral point 31x of the stator coil 31a. The negative electrode of the DC power source 81 is connected to the negative electrode of the power supply capacitor 71. The negative electrode of the power supply capacitor 71 is connected to the negative bus 74 through the resistor 76. Thus, the negative electrode of the DC power source 81 is connected to the negative bus 74 through the resistor 76.

The positive electrode of the smoothing capacitor 83 is connected to the neutral point 31x of the stator coil 31a. The negative electrode of the smoothing capacitor 83 is connected to the negative electrode of the power supply capacitor 71.

The motor rotation speed control and the capacitor discharge control are executed as follows.

(Motor Rotation Speed Control)

The inverter control circuit 72 executes the motor rotation speed control processing in the similar manner as in the first embodiment shown in FIG. 3.

However, the power supply capacitor 71 is charged differently by the execution of step S100a (FIG. 3).

Specifically, the inverter control circuit 72 repeats a series of steps S100a, S110a, S120a and S130a as in the first embodiment, as long as the command rotation speed Na is received from the electronic control unit 90.

As a result, the three-phase AC currents are outputted from the common junctions T1, T2 and T3 to the stator coil 31a based on the output voltage of the power supply capacitor 71 and the output voltage of the DC power source 81.

When the transistors 70a to 70f are switching-controlled, the power supply capacitor 71 is charged with electric charge.

If the transistor 70b turns on among the transistors 70b, 70d and 70f on the negative bus 74 side, the current flows from the neutral point 31x of the stator coil 31a to the negative electrode of the power supply capacitor 71 through the W-phase coil 312, the transistor 70b, the negative bus 74 and the resistor 76 based on the output voltage of the DC power source 81. The stator coil 31a responsively generates an induced voltage.

Then, if the transistor 70b turns off, the current corresponding to the induced voltage flows from the neutral point 31x of the stator coil 31a to the positive electrode of the power supply capacitor 71 through the W-phase coil 312, the diode D1 and the positive bus 75. The electric charge is thus charged in the power supply capacitor 71.

(Discharge Control)

The inverter control circuit 72 executes the motor rotation speed control processing shown in FIG. 12.

The capacitor discharge control processing in the seventh embodiment is different from that of the first embodiment in respect of step S210 shown in FIG. 12.

Specifically, at step S210, the transistors 70a, 70c and 70e are turned on while turning off the transistors 70b, 70d and 70f.

Figure 21:
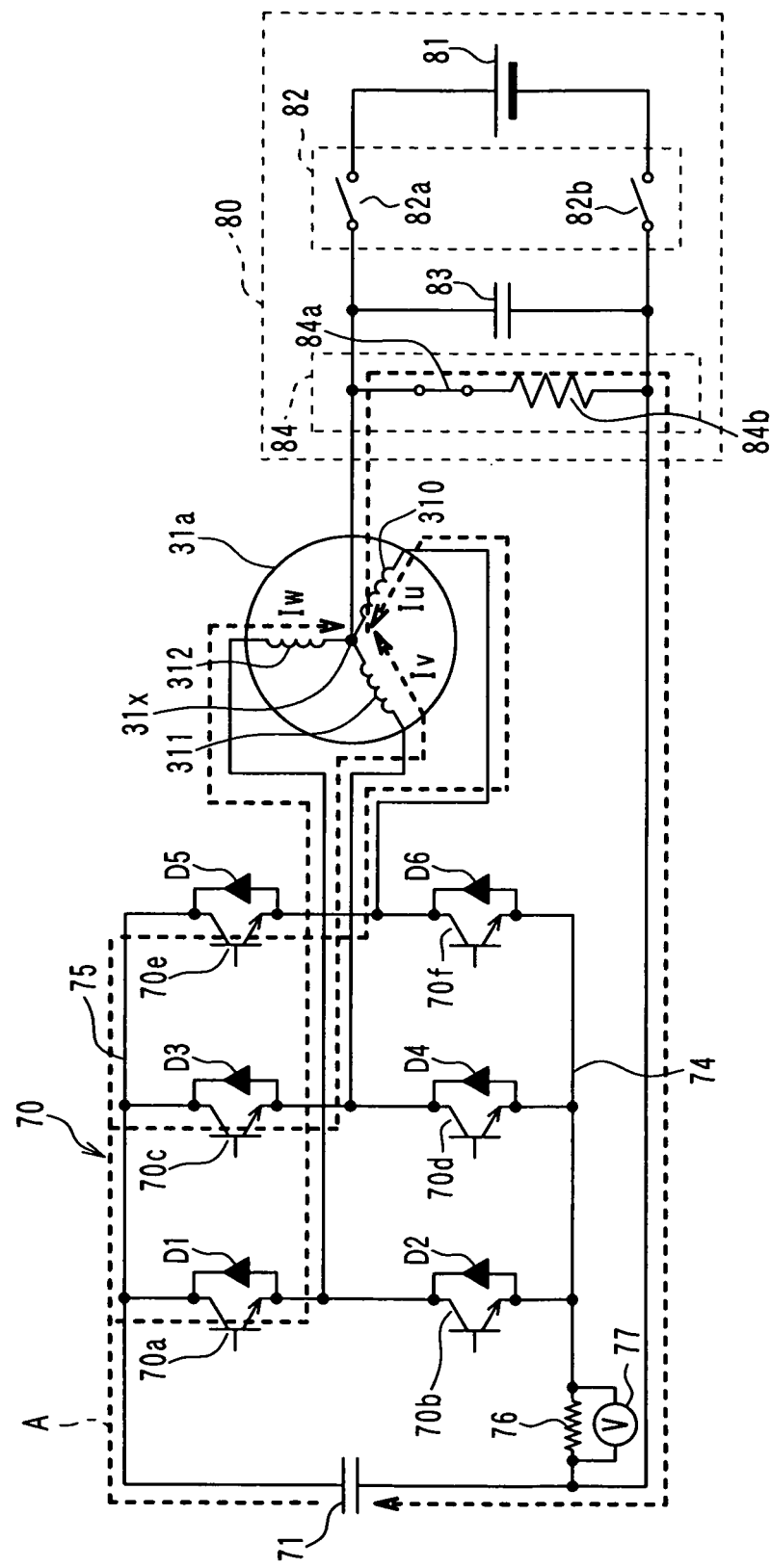
FIG. 21 is a circuit diagram showing a flow path of a current, which flows from a positive electrode to a negative electrode of a capacitor in the seventh embodiment.

Then, as shown in the arrow A in the thick chain line in FIG. 21, the discharge current flows to the positive bus 75 from the positive electrode of the power supply capacitor 71. This discharge current is shunted into the W-phase current Iw, the V-phase current Iv and the U-phase current Iu. The polarity of the phase currents are not indicated.

The V-phase current Iv flows to the neutral point 31x through the transistor 70c and the V-phase coil 311. The U-phase current Iu flows to the neutral point 31x through the transistor 70e and the U-phase coil 310. The W-phase current Iw flows to the neutral point 31x through the transistor 70a and the W-phase coil 310.

The current Iu, the V-phase current Iv and the W-phase current Iw flowing to the neutral point 31x flow to the negative electrode of the power supply capacitor 71 through the relay switch 84a and the resistor 84b. The electric charge is thus discharged from the power supply capacitor 71.

In the seventh embodiment, at step S210, the inverter control circuit 72 turns off the transistors 70b, 70d and 70f and turns on the transistors 70a, 70c and 70e. The discharge current is allowed to flow from the positive electrode of the power supply capacitor 71 to the negative electrode of the same through the stator coil 31a. As a result, the electric charge of the power supply capacitor 71 is discharged.

In the seventh embodiment, in place of turning on all the transistors 70a, 70c and 70e on the positive bus 75 side, only two of the transistors 70a, 70c and 70e may be turned on while turning off the other one of the same. Alternatively, only one of the three transistors 70a, 70c and 70e may be turned on while turning off the other two of the same.

Eighth Embodiment

According to the eighth embodiment, it is checked whether the system main relay 82 is turned off based on the output voltage of the electric power unit 80 in place of referring to the main relay-off signal of the electronic control unit 90.

Figure 22:
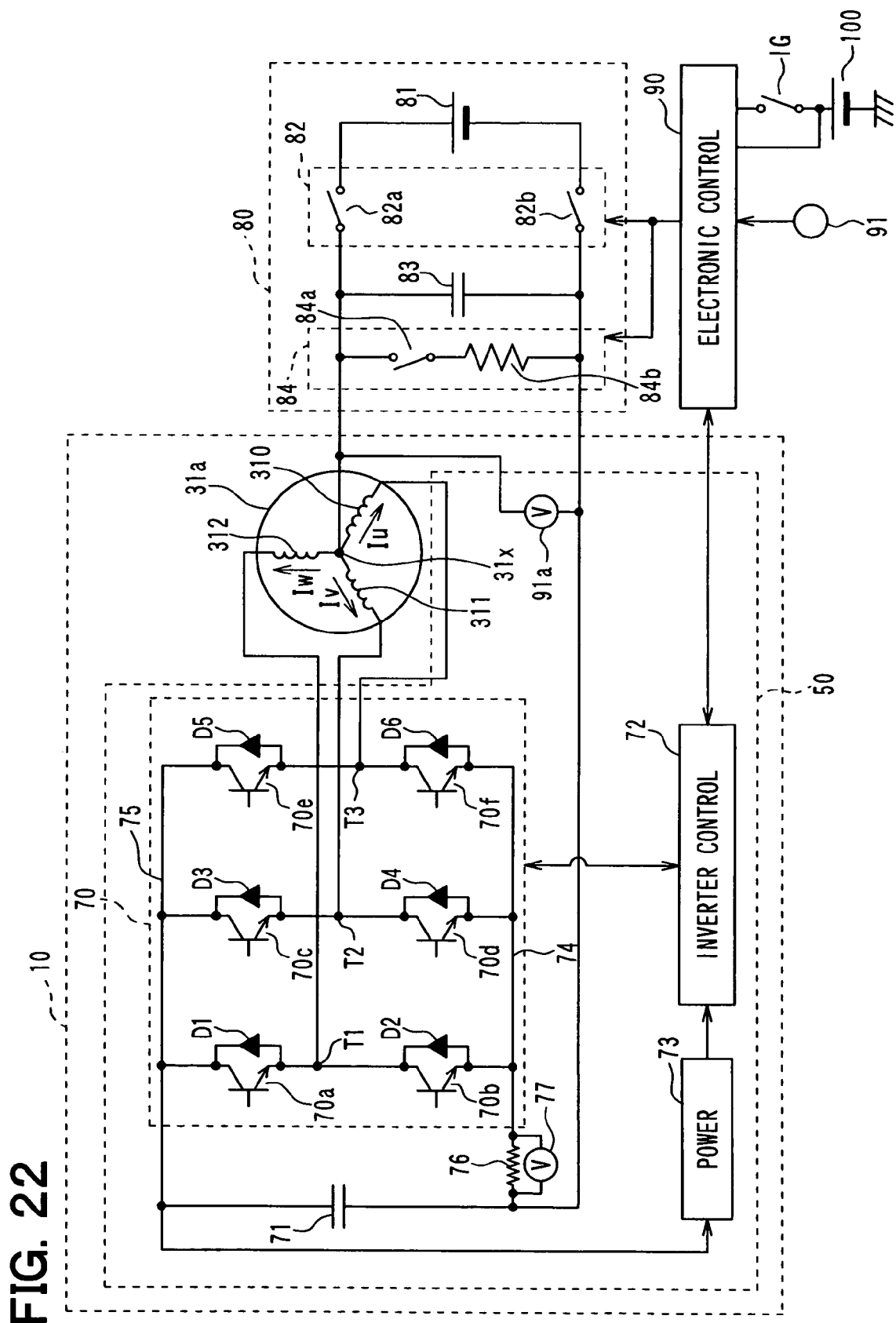
FIG. 22 is an electric circuit diagram of the driving apparatus and the electric power source unit in an eighth embodiment of the present invention.

In the eighth embodiment, as shown in FIG. 22, the driving apparatus 50 is further provided with a voltage sensor 91a relative to the seventh embodiment shown in FIG. 20. One detection terminal of the voltage sensor 91a is connected to the neutral point 31x of the stator coil 31a, and the other detection terminal of the voltage sensor 91a is connected to the negative electrode of the power supply capacitor 71.

Here, the negative electrode of the power supply capacitor 71 is connected to the negative bus 74 through the resistor 76, which has a very small resistance.

The voltage sensor 91a thus detects the voltage between the neutral point 31x of the stator coil 31a and the negative bus 74. The detection voltage of the voltage sensor 91a is used to check whether the system main relay 82 is turned off by the inverter control circuit 72.

The eighth embodiment operates in the similar manner as the seventh embodiment but differently in respect to step S200 shown in FIG. 12.

The inverter control circuit 72 checks at step S200 in FIG. 12 whether the detection voltage of the voltage sensor 91a is lower than the predetermined voltage. Thus, it is checked whether the system main relay 82 (SMR in FIG. 12) is turned on.

When the ignition switch IG is turned on, the electronic control unit 90 turns on the switches 82a and 82b of the system main relay 82 while turning off the relay switch 84a of the discharge circuit 84.

The positive electrode of the DC power source 81 and the positive electrode of the smoothing capacitor 83 are thus connected. Further, the negative electrode of the DC power source 81 and the negative electrode of the smoothing capacitor 83 are connected.

The output voltage of the DC power source 81 is thus smoothed and supplied between the neutral point 31x and the negative bus 74.

Therefore, the voltage between the neutral point 31x and the negative electrode of the power supply capacitor 71 becomes higher than the predetermined voltage. That is, the voltage between the neutral point 31x and the negative bus 74 becomes higher than the predetermined voltage. That is, the detection voltage of the voltage sensor 91a becomes higher than the predetermined voltage. The check at step S200 therefore results in NO, which indicates that the system main relay 82 is in the turned-on state.

The electronic control unit 90 turns off the switches 82a and 82b of the system main relay 82 and turns on the relay switch 84a of the discharge circuit 84, when it is determined that the hybrid vehicle had an impact of collision with the other vehicle, based on the detection signal of the collision detection sensor 91.

The positive electrode of the DC power source 81 and the positive electrode of the smoothing capacitor 83 are disconnected from each other. The negative electrode of the DC power source 81 and the negative electrode of the smoothing capacitor 83 is also disconnected. The output voltage of the DC power source 81 is not supplied to the inverter control circuit 72.

With the turning-on of the relay switch 84a of the discharge circuit 84, a current flows from the positive electrode of the smoothing capacitor 83 to the negative electrode of the same through the relay switch Ma and the resistor 84b. As a result, the voltage between the positive electrode and the negative electrode of the smoothing capacitor 83 is decreased gradually.

Thus, the voltage between the negative electrode of the power supply capacitor 71 and the neutral point 31x of the stator coil 31a falls gradually to be lower than the predetermined voltage. Therefore, the voltage between the negative bus 74 and the neutral point 31x of the stator coil 31a falls to be lower than the predetermined voltage. The detection voltage of the voltage sensor 91a falls to be lower than the predetermined voltage in the end.

The check at step S200 executed by the inverter control circuit 72 results in YES, which indicates that the system main relay 82 is turned off.

According to the eighth embodiment, the voltage between the neutral point 31x of the stator coil 31a and the negative bus 74 fluctuates in correspondence to the turning-on and turning-off of the switches 81a and 82b of the system main relay 82. Therefore, the voltage sensor 91a is provided for detecting the voltage between the neutral point 31x of the stator coil 31a and the negative 74. The inverter control circuit 72 can check whether the system main relay (SMR) 82 is turned on based on the detection voltage of the voltage sensor 91a.

In the eighth embodiment, one detection terminal and the other detection terminal of the voltage sensor 91a may be connected to the neutral point 31x of the stator coil 31a and the negative bus 74. In this case, the voltage sensor 91a detects the voltage between the neutral point 31x of the stator coil 31a and the negative bus 74 directly.

Ninth Embodiment

Figure 23:
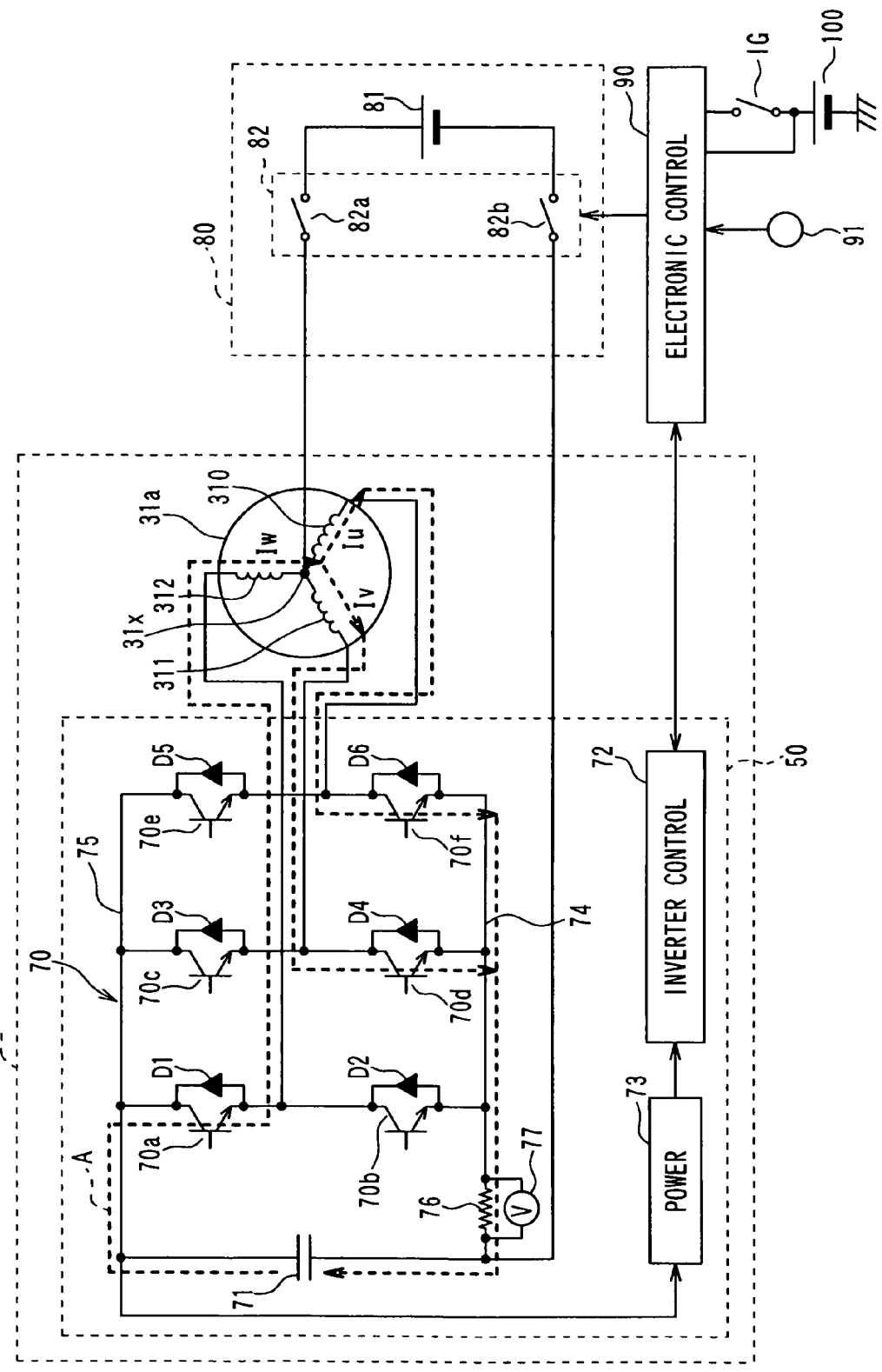
FIG. 23 is an electric circuit diagram of the driving apparatus and the electric power source unit in a ninth embodiment of the present invention.

According to the ninth embodiment, differently from the seventh embodiment shown in FIG. 20, the power supply capacitor 71 is discharged without the discharge circuit of the electric power unit 80 as shown in FIG. 23.

In operation, the ninth embodiment operates differently from the seventh embodiment in that step S210 shown in FIG. 12 is executed differently by the inverter control circuit 72.

Specifically, at step S210 in FIG. 12, the transistors 70a, 70d and 70f are turned on while turning off the transistors 70b, 70c and 70e. As a result, as shown by the thick chain line arrow A in FIG. 23, the discharge current flows from the positive electrode of the power supply capacitor 71 to the neutral point 31x of the stator coil 31a through the transistor 70a and the W-phase coil 312. This current is shunted into the V-phase current Iv and the U-phase current Iu at the neutral point 31x.

The V-phase current Iv flows from the neutral point 31x to the negative bus 74 through the V-phase coil 311 and the transistor 70d. The U-phase current Iu flows from the neutral point 31x to the negative bus 74 through the U-phase coil 310 and the transistor 70f.

Thus, the U-phase current Iu and the V-phase current Iv flow to the negative electrode of the power supply capacitor 71 through the resistor 76. The electric charge is discharged from the power supply capacitor 71.

Thus, in the ninth embodiment having no discharge circuit in the electric power unit 80, the transistors 70a, 70d and 70f are turned on while turning off the transistors 70b, 70c and 70e. Therefore, the discharge current is allowed to flow from the positive terminal to the negative terminal of the power supply capacitor 71 through the stator coil 31a. Thus the power supply capacitor 71 is discharged in the similar manner as in the seventh embodiment.

In the ninth embodiment, the power supply capacitor 71 may be discharged in the different way, while still discharging the power supply capacitor 71 from the positive electrode to the negative electrode of the power supply capacitor 71 through the transistors of the inverter circuit 70 and the stator coil 31a.

Specifically, the transistors 70c and 70e on the positive bus 75 side may be turned on in place of the transistor 70a and the transistor 70b on the negative bus 74 side may be turned on in place of the transistors 70d and 70f.

Tenth Embodiment

Figure 24:
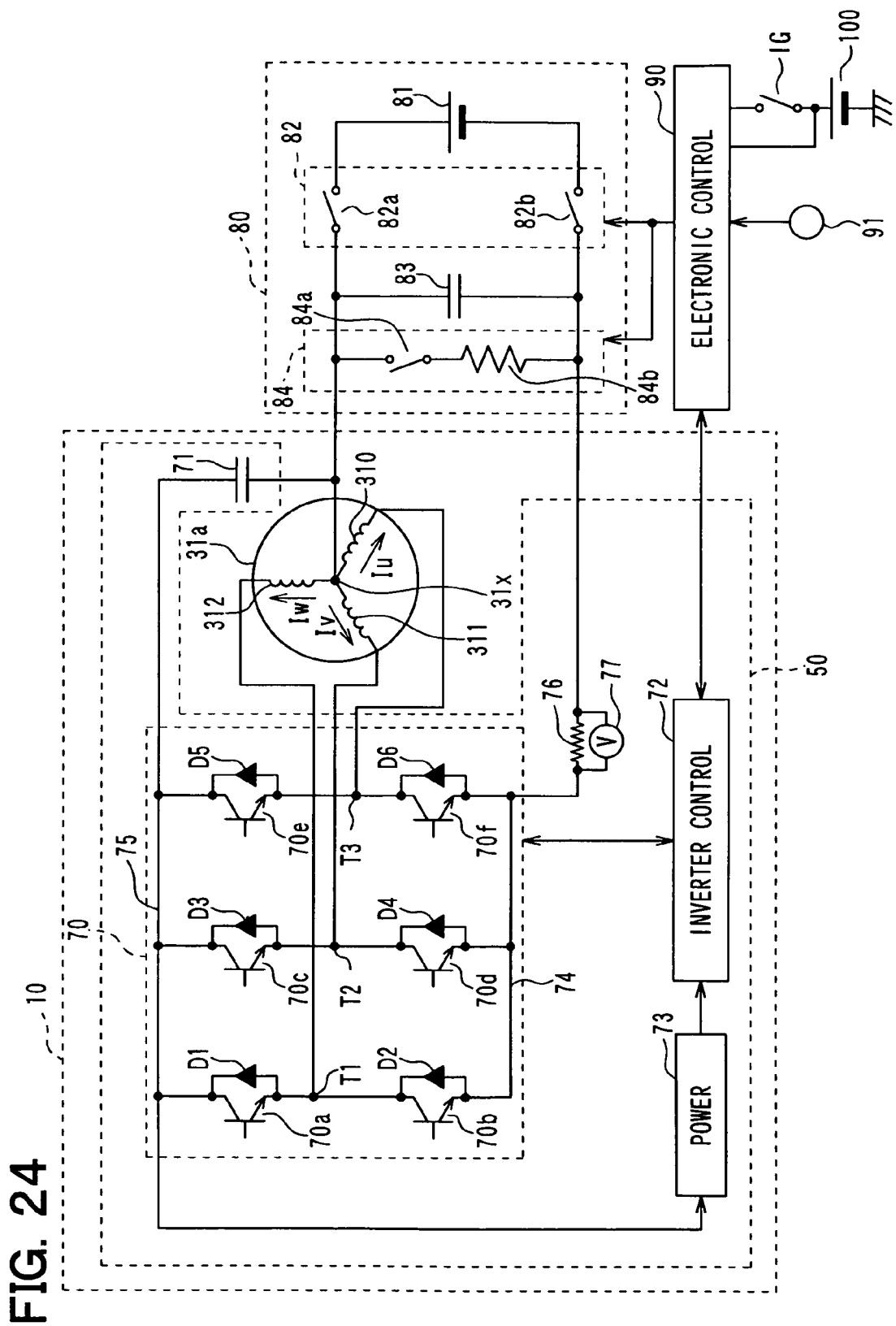
FIG. 24 is an electric circuit diagram of the driving apparatus and the electric power source unit in a tenth embodiment of the present invention.

According to the tenth embodiment, differently from the seventh embodiment shown in FIG. 20, the power supply capacitor 71 is connected between the positive bus 75 and the neutral point 31x of the stator coil 31a as shown in FIG. 24.

In addition, the resistor 76 and the voltage sensor 77 are provided differently from the seventh embodiment.

Specifically, the resistor 76 is connected between the negative electrode of the DC power source 81 and the negative bus 74. The voltage sensor 77 is connected in parallel to the resistor 76 between the negative electrode of the DC power source 81 and the negative bus 74.

The tenth embodiment operates differently from the seventh embodiment in that step S210 shown in FIG. 12 is executed differently.

Specifically, at step S210, the transistors 70a, 70c and 70e are turned on while turning off the transistors 70b, 70d and 70f.

Figure 25:
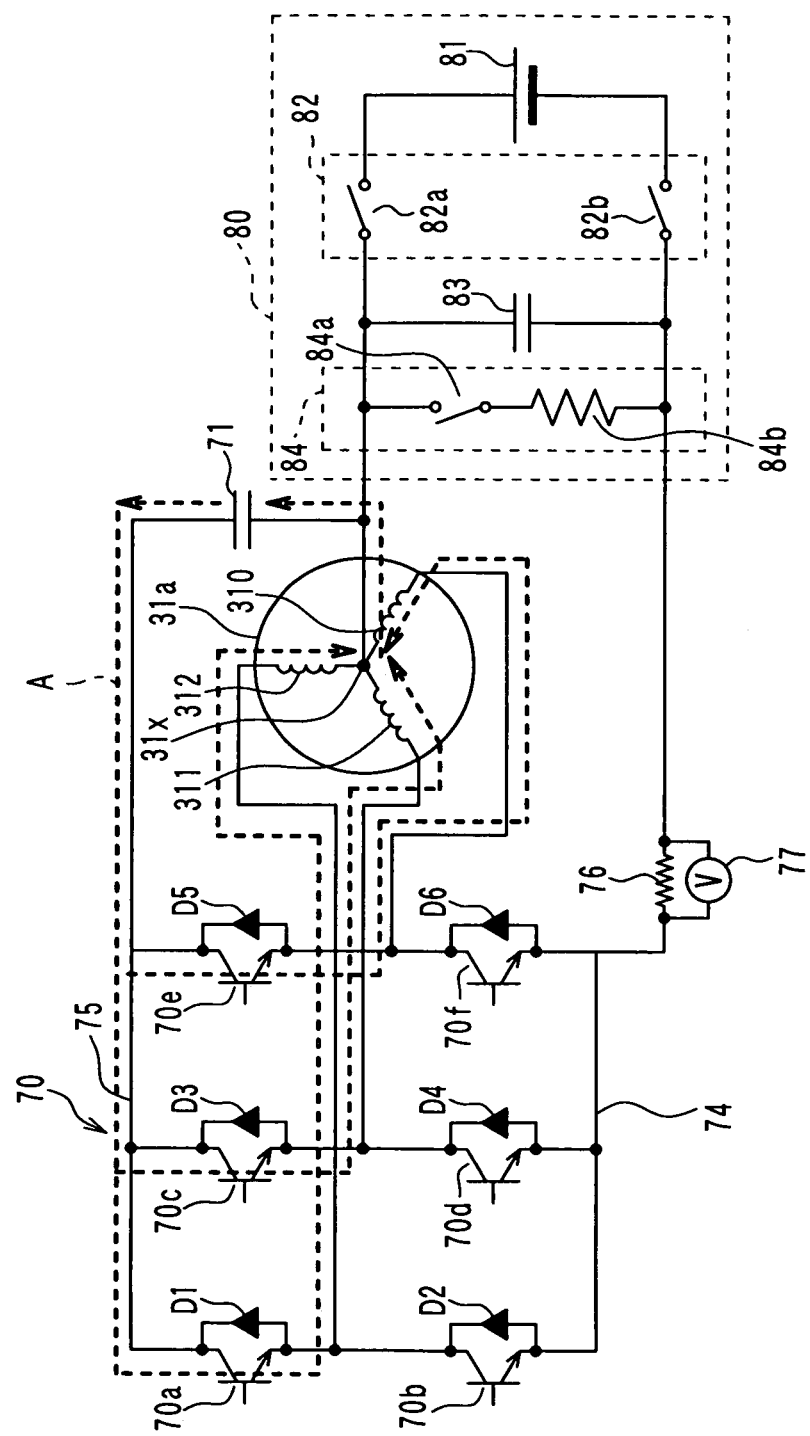
FIG. 25 is a circuit diagram showing a flow path of a current, which flows from a positive electrode to a negative electrode of a capacitor in the tenth embodiment.

As a result, as shown by the arrow A of the thick chain line in FIG. 25, the discharge current flows to the positive bus 75 from the positive electrode of the power supply capacitor 71. This discharge current is shunted into the W-phase current Iw, the V-phase current Iv and the U-phase current Iu from the positive bus 75. The polarity of the phase currents Iw, Iv and Iu is not indicated.

The W-phase current Iw flows to the neutral point 31x through the W-phase coil 312 from the transistor 70a. The V-phase current Iv flows to the neutral point 31x through the V-phase coil 311 from the transistor 70c. The U-phase current Iu flows to the neutral point 31x through the U-phase coil 310 from the transistor 70e. Thus, the W-phase current Iw, the U-phase current Iu and the V-phase current Iv, which flow to the neutral point 31x, flow to the negative electrode of the power supply capacitor 71. Thus the electric charge is discharged from the power supply capacitor 71.

According to the tenth embodiment, the inverter control circuit 72 turns off the transistors 70b, 70d and 70f and turns on the transistors 70a, 70c and 70e at step S210. For this reason, the discharge current is allowed to flow from the positive electrode of the power supply capacitor 71 to the negative electrode of the same through the stator coil 31a. Therefore, the electric charge is discharged from the power supply capacitor 71 in the same manner as in the first embodiment.

The electric charge is discharged from the power supply capacitor 71 from the positive electrode to the negative electrode without any discharge circuit in the electric power unit 80.

In the tenth embodiment, in place of turning on all the three transistors 70a, 70c and 70e on the positive bus 75 side, only two of the transistors 70a, 70c and 70e may be turned on to discharge the power supply capacitor 71. Alternatively, only one of the transistors 70a, 70c and 70e on the positive bus 75 side may be turned on.

Further, the inverter control circuit 72 may be configured to check whether the system main relay 82 is turned on based on the voltage between the negative bus 74 and the neutral point 31x of the stator coil 31a.

Specifically, a voltage sensor which detects the voltage between the negative bus 74 and the neutral point 31x of the stator coil 31a is added to the driving apparatus 50. The inverter control circuit 72 is configured to check whether the system main relay 82 is turned on by checking whether the detection voltage of the voltage sensor is lower than the predetermined voltage.

In the first to the tenth embodiments, the inverter control circuit 72 may be configured as follows.

Figure 26:
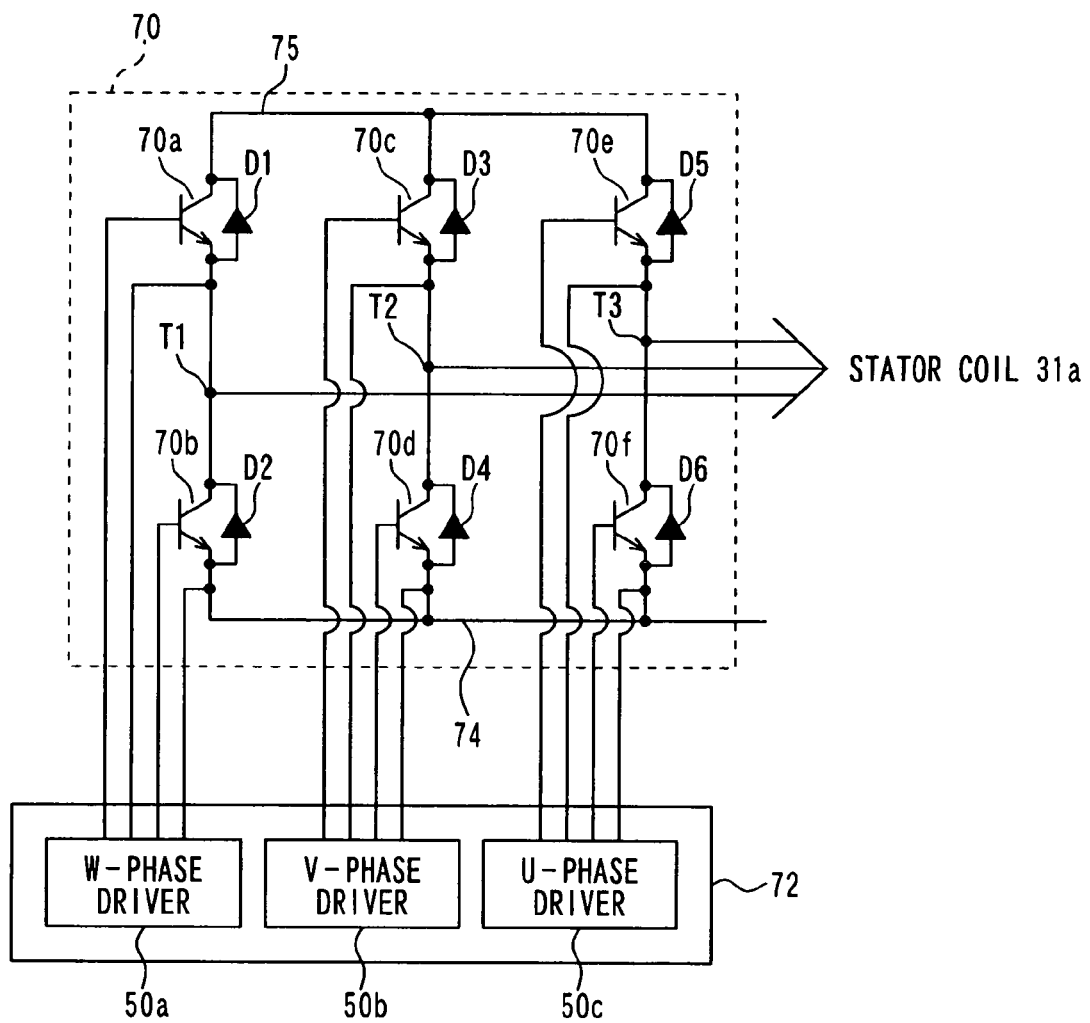
FIG. 26 is a circuit diagram of the inverter control circuit shown in FIG. 2.

(1) The inverter control circuit 72 includes, as shown in FIG. 26, a W-phase driver circuit 50a, a V-phase driver circuit 50b and a U-phase driver circuit 50c.

The W-phase driver circuit 50a turns on and turns off the transistors 70a and 70b, respectively. The V-phase driver circuit 50b turns on and turns off the transistors 70c and 70d, respectively. The U-phase driver circuit 50c turns on and turns off the transistors 70e and 70f, respectively.

Figure 27:
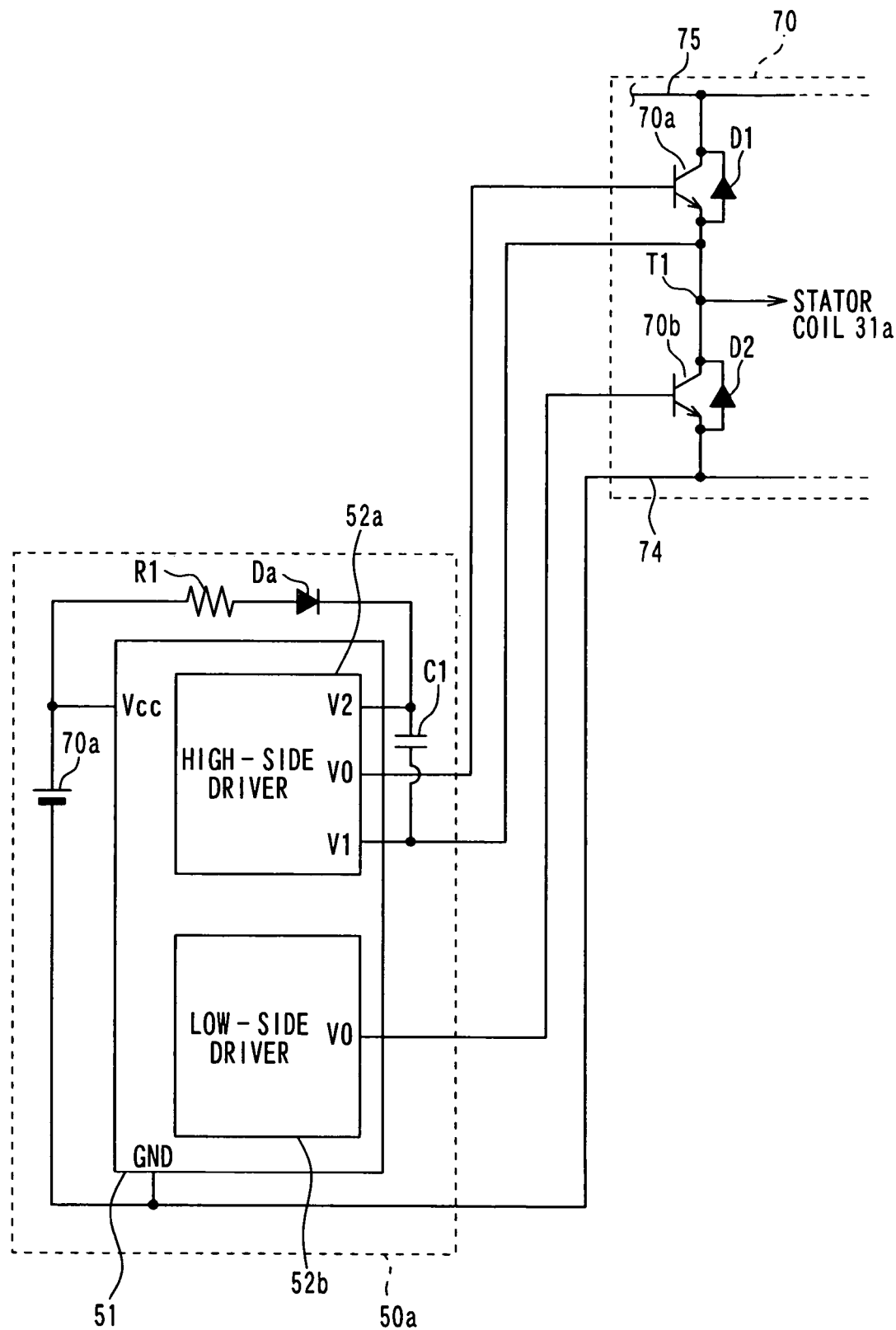
FIG. 27 is a circuit diagram of a W-phase driving circuit shown in FIG. 22.

All the W-phase driver circuit 50a, the V-phase driver circuit 50b and the U-phase driver circuit 50c have the same circuit structure, although the driver circuits 50a, 50b and 50c control the different transistors. As one example, the W-phase driver circuit 50a is described in more detail with reference to FIG. 27.

The W-phase driver circuit 50a has an integrated circuit 51 and a DC power source 70a. The W-phase driver circuit 50 has a power input terminal Vcc and a ground terminal. The DC power source 70a is connected between the power input terminal Vcc and the ground terminal. The integrated circuit 51 operates with the output voltage of the DC power source 70a.

The integrated circuit 51 includes a high-side driver circuit 52a and a low-side driver circuit 52b, which are a high-side driver circuit and a low-side driver circuit, respectively. The high-side driver circuit 52a has an output terminal Vo, which outputs a control signal to a base terminal of the transistor 70a. The control signal is applied to turn on and off the transistor 70a. Similarly, the low-side driver circuit 52b has an output terminal Vo, which outputs a control signal to a base terminal of the transistor 70b.

The high-side driver circuit 52a has a power input terminal V1 and a power input terminal V2. Between the power input terminal V2 and the power input terminal Vcc, a resistor R1 and a diode Da are connected in series. An emitter terminal of the transistor 70a is connected to the power input terminal V1.

Furthermore, a positive electrode of a capacitor C1 is connected to the power input terminal V2. A negative electrode of the capacitor C1 is connected to the power input terminal V1. A voltage Vc between the positive electrode and the negative electrode of the capacitor C1 is applied to the power input terminals V1 and V2.

The W-phase driver circuit 50 configured thus turns on the transistor 70b in advance of the switching operation of the transistor 70a. As a result, a current flows from the DC power source 70 to the capacitor C1 through the resistor R1 and the diode Da.

The voltage Vc between the positive electrode of the capacitor C1 and the negative electrode of the capacitor C1 is supplied between the power input terminals V1 and V2. The voltage Vc supplied between the power input terminals V1 and V2 ensures a potential difference Vbe between the base terminal and the emitter terminal of the transistor 70a to be higher than a predetermined voltage.

Therefore, even if the voltage between the emitter terminal of the transistor 70a and the negative bus 74 rises by the switching operation of the transistors 70a and 70b, the voltage Vbe between the base terminal and the emitter terminal of the transistor 70a is ensured to be higher than the predetermined voltage. Thus, the high-side driving circuit 52a turns on the transistor 70a regardless of the voltage between the emitter terminal of the transistor 70a and the negative bus 74.

Figure 28:
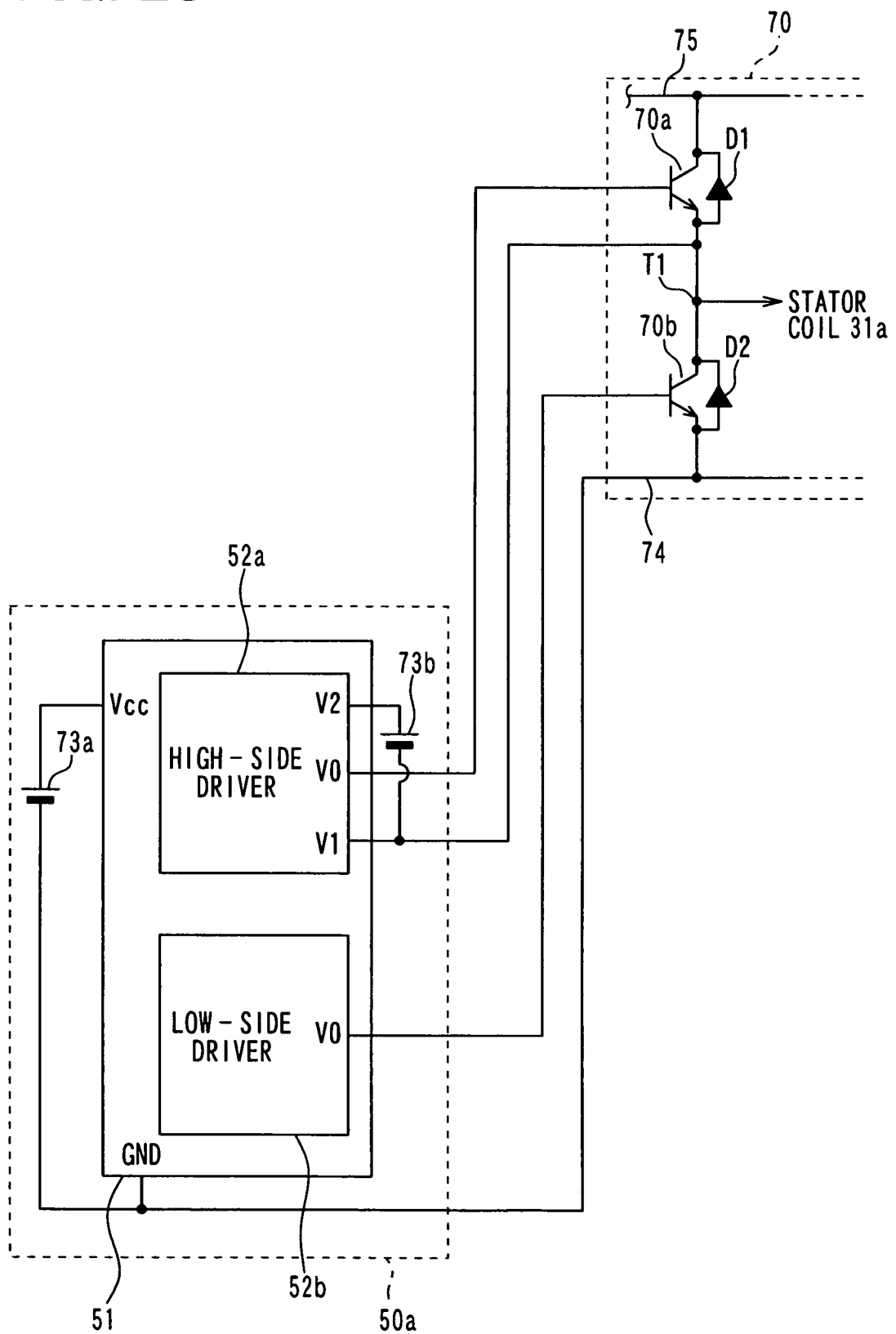
FIG. 28 is a circuit diagram of the W-phase driving circuit shown in FIG. 22.

(2) Another example of the W-phase driver circuit 50a is shown in FIG. 28. This W-phase driver circuit 50a has a DC power source 73b in place of the resistor R1, the diode Da and the capacitor C1 shown in FIG. 27.

A positive electrode of the DC power source 73b is connected to the power input terminal V2 of the high-side driver circuit 52a. The negative electrode of the DC power source 73b is connected to the power input terminal V1 of the high-side driving circuit 52a.

The DC power source 73b supplies its output voltage to the power input terminals V1 and V2. As a result, the potential difference Vbe between the base terminal and the emitter terminal of the transistor 70a is ensured to be higher than the predetermined voltage. Therefore, in the similar manner as the case (1), the high-side driver circuit 52a turns on the transistor 70a regardless of the voltage between the emitter terminal of the transistor 70a and the negative bus 74.

In the third to the tenth embodiments, as in the second embodiment, the rotation speed of the electric motor 30 may be gradually decreased before the inverter control circuit 72.

In the first to the tenth embodiments, the electronic control unit 90 may be configured to turn off the system main relay 82 before the hybrid vehicle actually receives a collision impact by determining that the hybrid vehicle will likely have a collision impact.

In order to check whether the hybrid vehicle will have a collision impact, a distance from the hybrid vehicle to a preceding vehicle may be measured by a distance sensor and a travel speed of the hybrid vehicle may be measured by a vehicle speed sensor. The possibility of collision of the subject vehicle may be determined if the distance detected by the distance sensor is shorter than a predetermined distance and the travel speed of the vehicle detected by the vehicle speed sensor is higher than a predetermined travel speed.

In the first to the tenth embodiments, only one of the switches 82a and 82b of the system main relay 82 may be used. In this instance, in the first to the sixth embodiments, the system main relay 82 connects and disconnects one of the positive bus 75 and the neutral point 31x to and from the DC power source 81, respectively. In the seventh to the tenth embodiment, however, the system main relay 82 connects or disconnects one of the neutral point 31x and the negative bus 74 to and from the DC power source 81, respectively.

In the first to the tenth embodiments, the phase currents Iw, Iv and Iu, which flow between the stator coil 31a and the common junctions T1, T2 and T3, may be calculated by using a Hall element or other sensors in place of using the resistor 76 and the voltage sensor 77.

In the first to the tenth embodiments, in place of estimating the rotation speed of the electric motor 30 based on the angular velocity of the three-phase AC currents, the rotation speed of the electric motor 30 may be detected by a rotation speed sensor. The rotation speed sensor may be an optical encoder. Alternatively, the rotation speed of the electric motor 30 may be calculated by estimation by measuring a leakage flux of the electric motor 30 by a magnetic sensor.

In the first to the tenth embodiment, the electric compressor device 10 may be fixedly attached to the rear wall of the engine of the hybrid vehicle. Alternatively, the electric compressor device 10 may be fixedly attached to the right wall or the left wall of the engine.

In the first to the tenth embodiment, the electric motor 30 may be a two-phase AC synchronous motor, a four or more-phase AC synchronous motor or an induction motor, which has a star-connected stator coil and a neutral point.

In the first to the tenth embodiments, the electric motor 30 may be used in any device (for example, blower motor, travel motor) other than the electric compressor device 10.

In the first to the tenth embodiments, the electric motor 30 may be used in an electric vehicle having no internal combustion engine. Further, the electric motor 30 may be used as a drive power source in a vehicle, which travels with only drive power of an internal combustion engine.

What is claimed is:

1. A driving apparatus for an electric motor mounted on a vehicle and having a stator coil, which is star-connected to a neutral point, the driving apparatus comprising:
   an inverter circuit having a plurality of pairs of switching elements connected in parallel between a positive bus and a negative bus, each pair of the switching elements including a high-side switching element and a low-side switching element connected in series in correspondence to each phase of the motor;
   a power supply capacitor connected between the positive bus and the negative bus;
   a DC power source connected between the positive bus and the neutral point of the stator coil;
   a power source switch connected between the DC power source and at least one of the positive bus and the neutral point;
   a smoothing capacitor connected between the positive bus and the neutral point for smoothing an output voltage outputted from the DC power source to the positive bus and the neutral point; and
   a discharge switch connected between a positive electrode of the smoothing capacitor and a negative electrode of the smoothing capacitor,
   wherein the inverter circuit is configured to output AC currents to the stator coil based on output voltages of the DC power source and the power supply capacitor by a switching operation of the switching elements,
   wherein the inverter circuit includes a check section for checking whether the power source switch is in a turned-off state, in which at least one of the positive bus and the neutral point is disconnected from the DC power source,
   wherein the inverter circuit further includes a control section for controlling the switching elements to allow a current to flow from a positive electrode of the power supply capacitor to a negative electrode of the power supply capacitor through the stator coil, when the check section determines that the power source switch is in the turned-off state, and
   wherein the control section turns on the low-side switching element to thereby allow the current to flow from the positive electrode of the power supply capacitor to the negative electrode of the power supply capacitor through the discharge switch, the stator coil and the low-side switching element.

2. The driving apparatus according to claim 1, wherein:
   the control section turns on the high-side switching element and the low-side switching element to thereby allow the current to flow from the positive electrode of the power supply capacitor to the negative electrode of the power supply capacitor through the high-side switching element, the stator coil and the low-side switching element.

3. The driving apparatus according to claim 1, wherein:
   the check section further checks whether the power source switch is in a turned-off state, in which at least one of the positive bus and the neutral point is disconnected from the DC power source, based on a signal received from an electronic control unit, which controls the power source switch.

4. The driving apparatus according to claim 1, further comprising:
   a voltage sensor provided to detect a voltage between the positive bus and the neutral point,
   wherein the check section further checks whether the power source switch is in a turned-off state, in which at least one of the positive bus and the neutral point is disconnected from the DC power source, based on whether the voltage detected by the voltage sensor is lower than a predetermined voltage.

5. A driving apparatus for an electric motor mounted on a vehicle and having a stator coil, which is star-connected, to a neutral point, the driving apparatus comprising:
   an inverter circuit having a plurality of pairs of switching elements connected in parallel between a positive bus and a negative bus, each pair of the switching elements including a high-side switching element and a low-side switching element connected in series in correspondence to each phase of the motor;
   a power supply capacitor connected between the positive bus and the negative bus;
   a DC power source connected between the neutral point and the negative bus;
   a power source switch connected between at least one of the neutral point and the negative bus and the DC power source;
   a smoothing capacitor connected between the neutral point and the negative bus for smoothing an output voltage outputted from the DC power source to the neutral point and the negative bus; and
   a discharge switch connected between a positive electrode of the smoothing capacitor and a negative electrode of the smoothing capacitor,
   wherein the inverter circuit is configured to output AC currents to the stator coil based on output voltages of the DC power source and the power supply capacitor by a switching operation of the switching elements,
   wherein the inverter circuit includes a check section for checking whether the power source switch is in a turned-off state, in which at least one of the neutral point and the negative bus is disconnected from the DC power source,
   wherein the inverter circuit further includes a control section for controlling the switching elements to allow a current to flow from a positive electrode of the power supply capacitor to a negative electrode of the power supply capacitor through the stator coil, when the check section determines that the power source switch is in the turned-off state, and
   wherein the control section turns on the high-side switching element to thereby allow the current to flow from the positive electrode of the power supply capacitor to the negative electrode of the power supply capacitor through high-side switching element, the stator coil and the discharge switch.

6. The driving apparatus according to claim 5, wherein:
   the control section turns on the high-side switching element and the low-side switching element to thereby allow the current to flow from the positive electrode of the power supply capacitor to the negative electrode of the power supply capacitor through the high-side switching element, the stator coil and the low-side switching element of the other phases.

7. The driving apparatus according to claim 5, wherein:
the check section further checks whether the power source switch is in a turned-off state, in which at least one of the neutral point and the negative bus is disconnected from the DC power source, based on a signal received from an electronic control unit, which controls the power source switch.

8. The driving apparatus according to claim 5, further comprising:
a voltage sensor provided to detect a voltage between the positive bus and the neutral point,
wherein the check section further checks whether the power source switch is in a turned-off state, in which at least one of the neutral point and the negative bus is disconnected from the DC power source, based on whether the voltage detected by the voltage sensor is lower than a predetermined voltage.

\* \* \* \* \*